(12) United States Patent
Kassir et al.

(10) Patent No.: US 12,253,621 B2
(45) Date of Patent: Mar. 18, 2025

(54) UPDATE RATE ADAPTATION FOR COLLABORATIVE RADAR AND MAPPING

(71) Applicant: QUALCOMM Incorporated, San Diego, CA (US)

(72) Inventors: Saadallah Kassir, Austin, TX (US); Kapil Gulati, Belle Mead, NJ (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/454,618

(22) Filed: Nov. 11, 2021

(65) Prior Publication Data

US 2023/0146061 A1    May 11, 2023

(51) Int. Cl.
   *G01S 7/00*     (2006.01)
   *G01S 13/89*    (2006.01)
   *H04W 24/10*    (2009.01)

(52) U.S. Cl.
   CPC .............. *G01S 7/003* (2013.01); *G01S 13/89* (2013.01); *H04W 24/10* (2013.01)

(58) Field of Classification Search
   CPC ......... G01S 7/003; G01S 13/89; H04W 24/10
   See application file for complete search history.

(56) References Cited

U.S. PATENT DOCUMENTS

| | | | |
|---|---|---|---|
| 2015/0382398 A1* | 12/2015 | Guo | H04W 52/0206 370/328 |
| 2016/0050653 A1* | 2/2016 | Rastogi | H04W 24/08 455/453 |
| 2018/0242182 A1* | 8/2018 | Rashid | H04W 88/06 |
| 2021/0099338 A1 | 4/2021 | Cheng et al. | |
| 2021/0258920 A1 | 8/2021 | Baghel et al. | |
| 2022/0225121 A1* | 7/2022 | Wanuga | H04L 5/0048 |
| 2023/0086144 A1* | 3/2023 | Roy | H04L 5/005 |

OTHER PUBLICATIONS

International Search Report and Written Opinion—PCT/US2022/047820—ISA/EPO—Feb. 9, 2023.

(Continued)

*Primary Examiner* — Peter M Bythrow
*Assistant Examiner* — Nazra Nur Waheed
(74) *Attorney, Agent, or Firm* — Procopio, Cory, Hargreaves & Savitch LLP/QUALCOMM Incorporated

(57) ABSTRACT

A first apparatus is provided that is configured to receive, from a wireless device, an indication enabling radar measurement sharing; receive a first set of configuration parameters for the radar measurement sharing; perform a radar measurement based on the first set of configuration parameters and network state information; and transmit a first set of radar measurement transmissions at a first radar measurement transmission rate selected based on the first set of configuration parameters and the network state information. In some aspects, a second apparatus is provided that is configured to select a first set of UEs from a plurality of UEs for radar measurement sharing; transmit, to each UE in the first set of UEs, an indication enabling the radar measurement sharing; and receive, from each UE in the first set of UEs, a radar measurement transmission based on a radar measurement performed at a corresponding UE.

30 Claims, 15 Drawing Sheets

(56) References Cited

OTHER PUBLICATIONS

Kassir S., et al., "Joint Update Rate Adaptation in Multiplayer Cloud-Edge Gaming Services: Spatial Geometry and Performance Tradeoffs", MobiHoc, Proceedings of the 22 International Symposium on Theory, Algorithmic Foundations, and Protocol Design for Mobile Networks and Mobile Computing, Jul. 26-29, 2021, pp. 191-200.

* cited by examiner

UPDATE RATE ADAPTATION FOR COLLABORATIVE RADAR AND MAPPING

INTRODUCTION

The present disclosure relates generally to communication systems, and more particularly, to a wireless communication system including radar measurements.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method for wireless communication is provided. The method includes transmitting, to each UE in a first set of one or more UEs, an indication to report at least one radar measurement. The method includes receiving, from each UE in the first set of one or more UEs, a radar measurement report based on a radar measurement performed at a corresponding UE in the first set of one of more UEs.

In an aspect of the disclosure, an apparatus for wireless communication is provided. The apparatus includes a memory and at least one processor coupled to the memory, the memory and the at least one processor configured to transmit, to each UE in a first set of one or more UEs, an indication to report at least one radar measurement, and receive, from each UE in the first set of one or more UEs, a radar measurement report based on a radar measurement performed at a corresponding UE in the first set of one of more UEs.

In an aspect of the disclosure, an apparatus for wireless communication is provided. The apparatus includes means for transmitting, to each UE in a first set of one or more UEs, an indication to report at least one radar measurement. The apparatus includes means for receiving, from each UE in the first set of one or more UEs, a radar measurement report based on a radar measurement performed at a corresponding UE in the first set of one of more UEs.

In an aspect of the disclosure, a computer-readable medium storing a program for execution by at least one processor coupled to the computer-readable medium is provided. The program including a set of instructions for transmitting, to each UE in a first set of one or more UEs, an indication to report at least one radar measurement. The program may further include sets of instructions for receiving, from each UE in the first set of one or more UEs, a radar measurement report based on a radar measurement performed at a corresponding UE in the first set of one of more UEs.

In an aspect of the disclosure, a method for wireless communication is provided. The method includes receiving, from a wireless device, an indication to report a radar measurement to the wireless device. The method also includes receiving a first set of configuration parameters for the radar measurement reporting. The method further includes performing a first radar measurement based on the first set of configuration parameters and network state information. The method also includes transmitting, at a first radar measurement report rate selected based on the first set of configuration parameters and the network state information, a first set of radar measurement reports.

In an aspect of the disclosure, an apparatus for wireless communication is provided. The apparatus includes a memory and at least one processor coupled to the memory, the memory and the at least one processor configured to receive, from a wireless device, an indication to report a radar measurement to the wireless device. The memory and the at least one processor may further be configured to receive a first set of configuration parameters for the radar measurement reporting. The memory and the at least one processor may further be configured to perform a first radar measurement based on the first set of configuration parameters and network state information. The memory and the at least one processor may further be configured to transmit, at a first radar measurement report rate selected based on the first set of configuration parameters and the network state information, a first set of radar measurement reports.

In an aspect of the disclosure, an apparatus for wireless communication is provided. The apparatus includes means for receiving, from a wireless device, an indication to report a radar measurement to the wireless device. The apparatus also includes means for receiving a first set of configuration parameters for the radar measurement reporting. The apparatus further includes means for performing a first radar measurement based on the first set of configuration parameters and network state information. The apparatus also includes means for transmitting, at a first radar measurement report rate selected based on the first set of configuration parameters and the network state information, a first set of radar measurement reports.

In an aspect of the disclosure, a computer-readable medium storing a program for execution by at least one processor coupled to the computer-readable medium is provided. The program including a set of instructions for receiving, from a wireless device, an indication to report a radar measurement to the wireless device. The program may further include sets of instructions for receiving a first set of configuration parameters for the radar measurement reporting. The program may further include sets of instructions for performing a first radar measurement based on the first set of configuration parameters and network state information. The program may further include sets of instructions for transmitting, at a first radar measurement report rate selected based on the first set of configuration parameters and the network state information, a first set of radar measurement reports.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
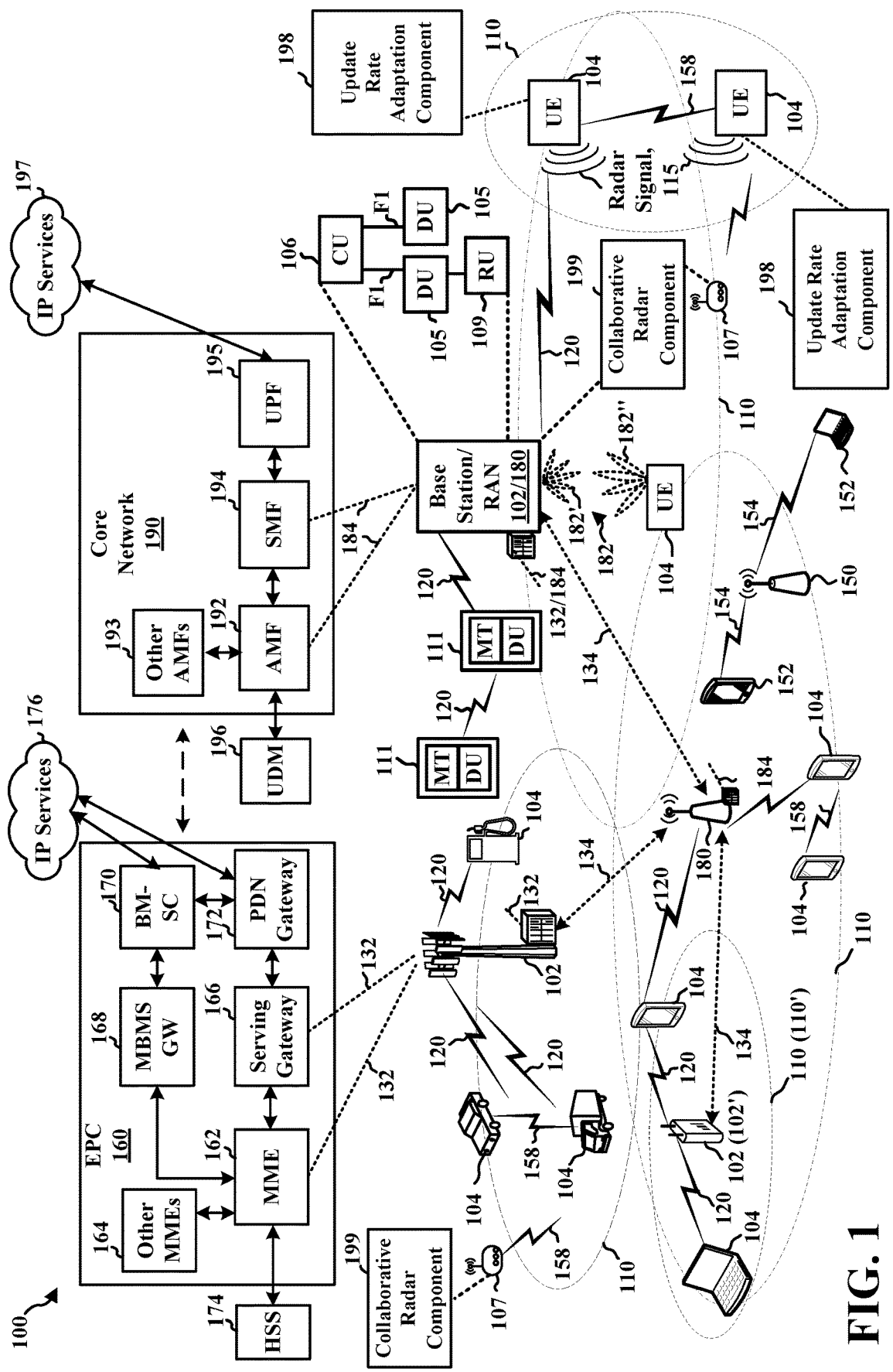
FIG. 1 is a diagram illustrating an example of a wireless communications system and an access network, in accordance with aspects presented herein.

In some aspects of wireless communication, radar-based sensing may provide information about obstacles and/or objects in an environment. For example, a base station or a road side unit (RSU) may have a radar component that transmits a radar signal and monitors for reflections of the radar signal that indicate the presence of a physical object or other information about the surrounding environment. The base station or RSU may use the information to adjust one or more parameters for wireless communication. In some aspects, radar measurements from at least one radar-capable device (e.g., a user equipment (UE), a base station, an RSU, etc.) may provide information about a region in a line-of-sight (LoS) associated with the radar-capable device. LoS may refer to regions that receive an unobstructed signal from the radar device. In some aspects, being aware of the environment outside the region in the LoS associated with a particular radar-capable device (or a network node) responsible for aggregating radar measurement information received from a set of additional radar devices (e.g., associated with a JCR system), may allow the particular radar-capable device (or the network node) to find available beam directions that may reach a vehicle or other UE. A joint communication-radar (JCR) system integrates radar and wireless communication functionalities using shared hardware and signal processing modules and, in some aspects, sharing transmitted signals. JCR systems may provide for reception, at a first radar device, of radar measurement information from a set of additional radar devices to improve an environment mapping through a collaborative radar measurement application that combines radar information from different perspectives (e.g., from different devices) within a wireless communication system. However, in some aspects, having each radar-capable device in a JCR system transmit a report regarding a set of radar measurements may result in network congestion.

Accordingly, aspects presented herein provide for improved wireless communication through selecting a subset of radar-capable devices to transmit radar measurements for the collaborative radar measurement and/or configuring the selected radar-capable devices to determine an update rate (e.g., a rate of transmitting radar measurement information) to reduce transmissions associated with the collaborative radar measurement and avoid network congestion by reducing a number of transmitting devices and/or a frequency of transmissions from transmitting devices associated with the collaborative radar measurement application. In some aspects, the subset of radar-capable devices and/or the determined update rate may be selected and/or determined to provide improved environment mapping based on the radar information from multiple devices while reducing network congestion associated with the improved environment mapping. Selecting the subset of radar-capable devices to report radar measurements and/or configuring the selected devices to determine an update rate may enable collaborative radar information sharing in a manner that improves network communication by reducing network congestion associated with the collaborative radar measurement (e.g., the JCR system) by reducing a number of transmissions associated with the collaborative radar measurement.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 15. Although the following description, including the example slot structure of FIG. 15, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" b and in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an update rate adaptation component 198 that may be configured to receive, from a wireless device, an indication enabling the radar measurement sharing with the wireless device; receive a first set of configuration parameters for the radar measurement sharing; perform a radar measurement based on the first set of configuration parameters and network state information; and transmit, at a first radar measurement transmission rate selected based on the first set of configuration parameters and the network state information, a first set of radar measurement transmissions. In certain aspects, the base station 180 may include a collaborative radar component 199 that may be configured to select a first set of one or more UEs from a plurality of UEs for the radar measurement sharing; transmit, to each UE in the first set of one or more UEs, an indication enabling the radar measurement sharing; and receive, from each UE in the first set of one or more UEs, a radar measurement transmission based on a radar measurement performed at a corresponding UE. Although the following description may be focused on 5G NR, the concepts described herein may be applicable to other similar areas, such as LTE, LTE-A, CDMA, GSM, and other wireless technologies.

Figure 2:
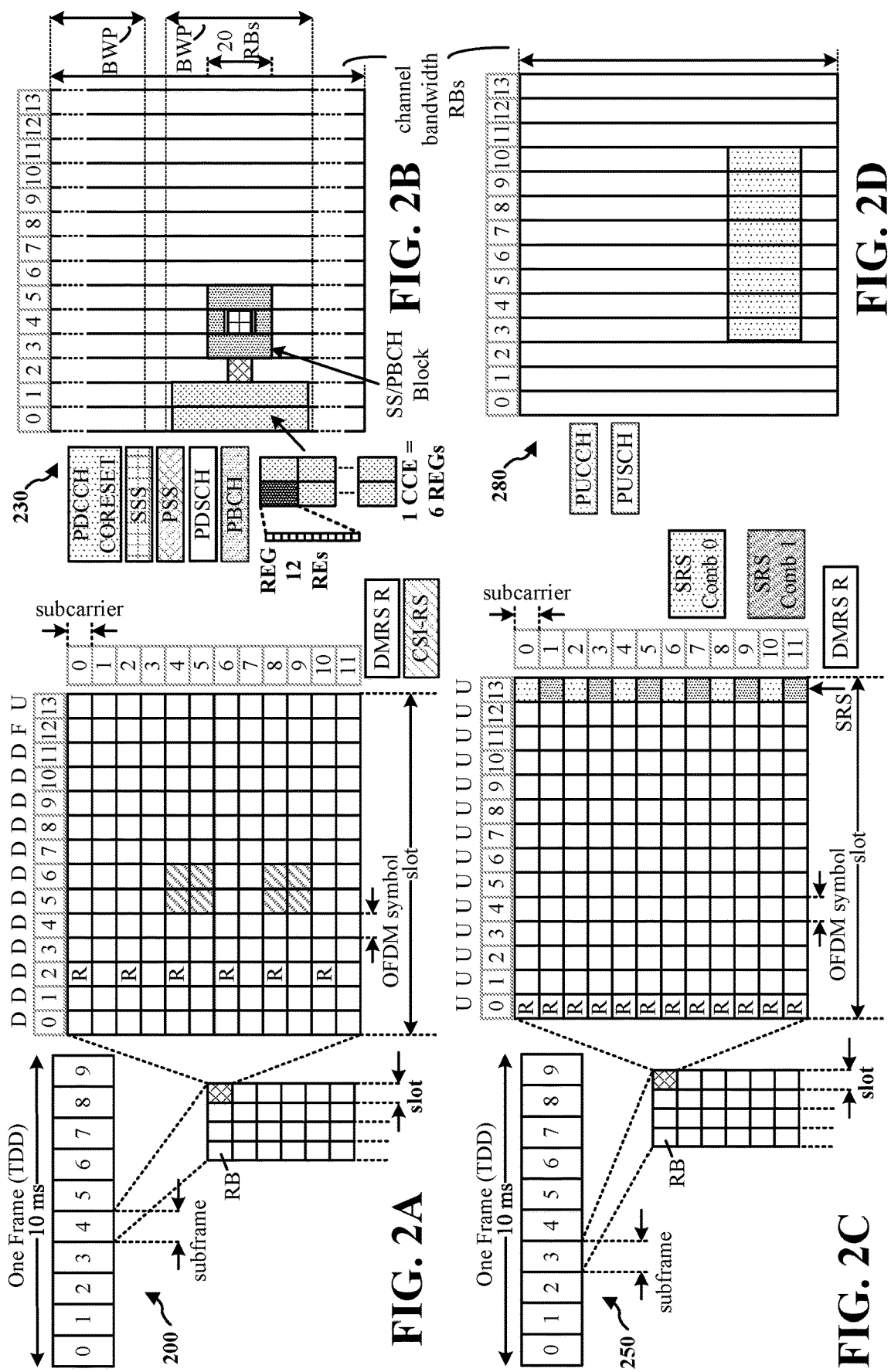
FIG. 2A is a diagram illustrating an example of a first subframe within a 5G NR frame structure.
FIG. 2B is a diagram illustrating an example of DL channels within a 5G NR subframe.
FIG. 2C is a diagram illustrating an example of a second subframe within a 5G NR frame structure.
FIG. 2D is a diagram illustrating an example of UL channels within a 5G NR subframe.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 15:
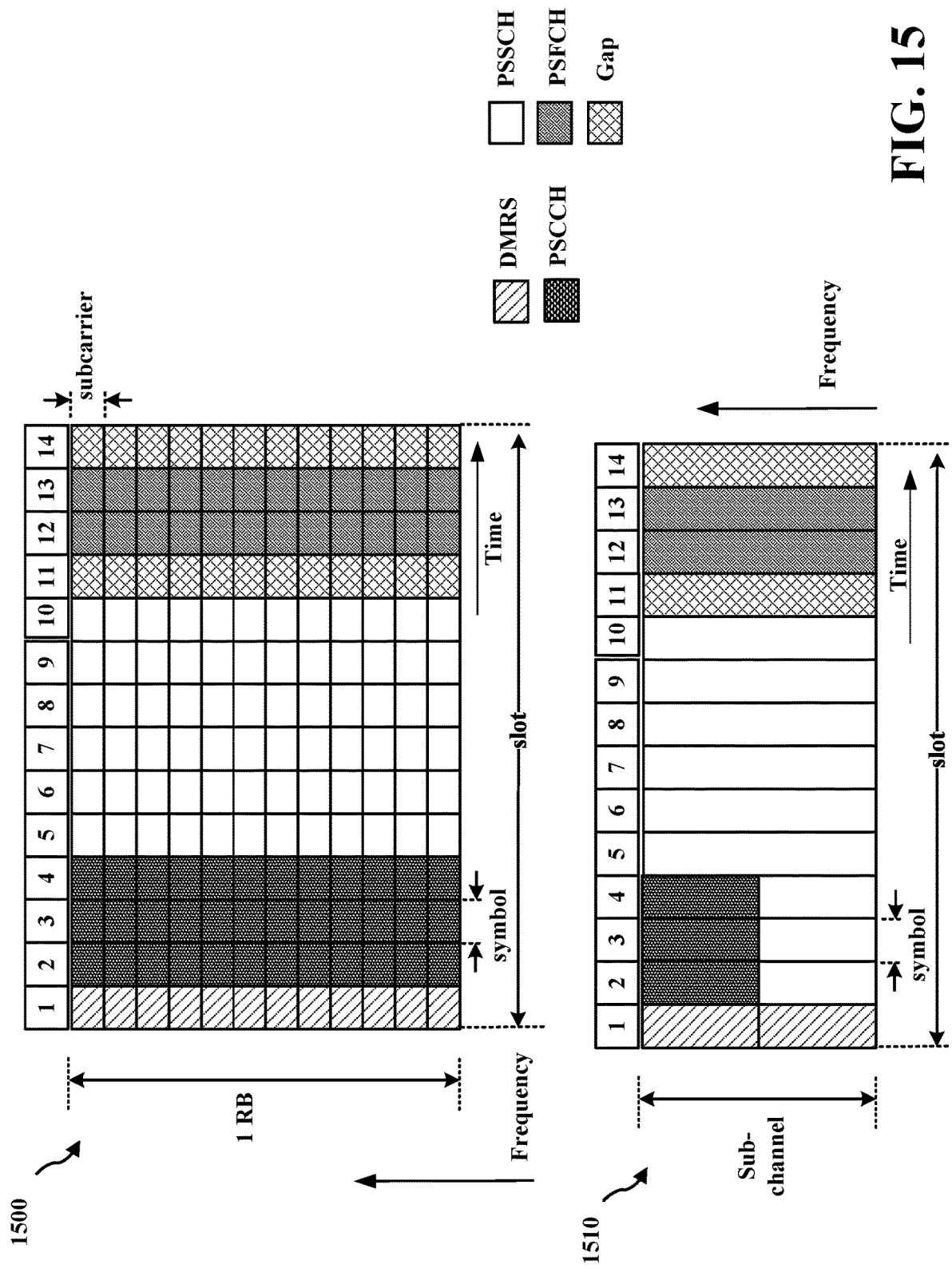
FIG. 15 illustrates example aspects of a sidelink slot structure, in accordance with aspects presented herein.

FIG. 15 includes diagrams 1500 and 1510 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 15 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 1500 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 1510 in FIG. 15 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 15, some of the REs may include control information in PSCCH and some REs may include demodulation RS (DMRS). At least one symbol may be used for feedback. FIG. 15 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 15. Multiple slots may be aggregated together in some aspects.

Figure 3:
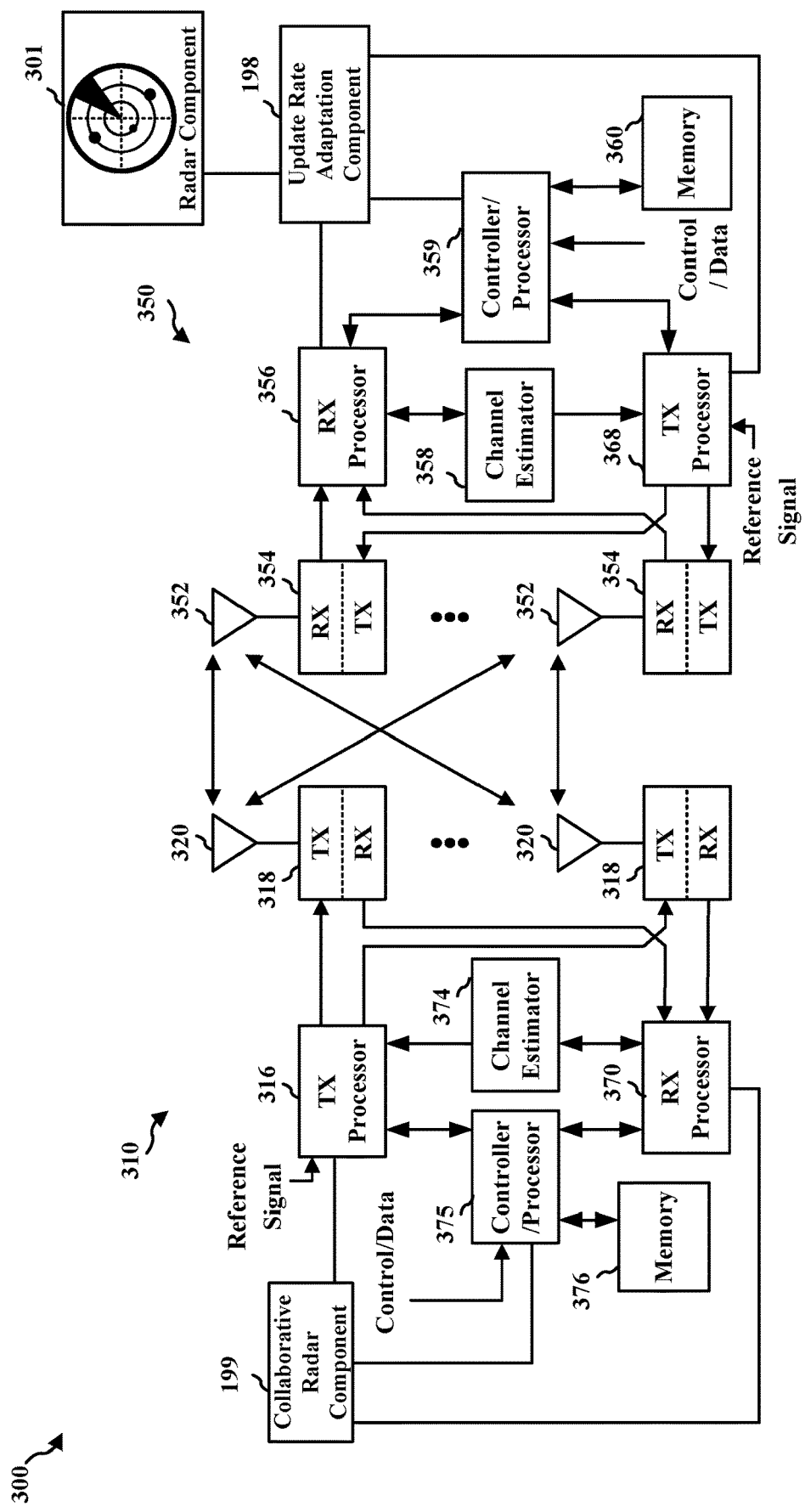
FIG. 3 is a block diagram of a base station in communication with a UE in an access network, in accordance with aspects presented herein.

FIG. 3 is a block diagram 300 of a first wireless communication device 310 in communication with a second wireless communication device 350. As illustrated in FIG. 3, one or more of the devices may include a radar component 301. As an example, FIG. 3 illustrates the device 350 including a radar component. In some aspects, the wireless communication may be based on sidelink. In some examples, the devices 310 and 350 may communicate based on V2X or other D2D communication. The sidelink communication may be based on a PC5 interface, in some aspects. The devices 310 and the 350 may comprise a UE, an RSU, a base station, etc. In some aspects, the wireless communication may be based on an access link, e.g., and may include Uu communication. For example, the device 310 may be a base station, and the device 350 may be a UE, in some aspects.

Packets may be provided to a controller/processor 375 that implements layer 3 and layer 2 functionality. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the device 310 in a manner similar to that described in connection with the receiver function at the device 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the update rate adaptation component 198 described in connection with FIG. 1.

At least one of the TX processor 316, the RX processor 370, and the controller/processor 375 may be configured to perform aspects in connection with the collaborative radar component 199 described in connection with FIG. 1.

For some aspects of wireless communication, radar-based sensing may provide information about obstacles and/or objects in an environment. In some aspects, a radar-capable device (e.g., a UE, a vehicle, a base station, an RSU, etc.), may perform radar measurements to obtain information about a region in a line-of-sight (LoS) associated with the radar-capable device. The radar measurements and identification of obstacles and/or objects in the environment may be used to improve wireless communication. In some aspects, the radar measurements may be used to improve cellular connectivity.

In some aspects, an awareness of the environment outside the LoS region associated with the radar-capable device, or a network node responsible for aggregating radar measurement information for a JCR application, may allow the radar-capable device (or the network node) to find available beam directions that may reach a UE and/or a vehicle. However, having multiple radar-capable devices transmit a report regarding a set of radar measurements to a network node at a preconfigured rate may result in network congestion. For example, in scenarios with dense concentrations of devices, having each device transmit at a maximum rate may cause congestion. As presented herein, in some aspects, a network node may select a subset of radar-capable devices such that the selected subset of radar-capable devices provides radar measurement information associated with different locations and a different LoS that represents a view of a region-of-interest with a threshold level of accuracy and/or coverage. Additionally, the selected subset of radar-capable devices may be provided a configuration for a radar measurement transmission rate calculation at each of the radar-capable devices in the subset of radar-capable devices. Selecting the subset of radar-capable devices and providing the configuration for the radar measurement transmission rate calculation may reduce network congestion associated with the JCR application (e.g., a radar measurement sharing application).

Figure 14:
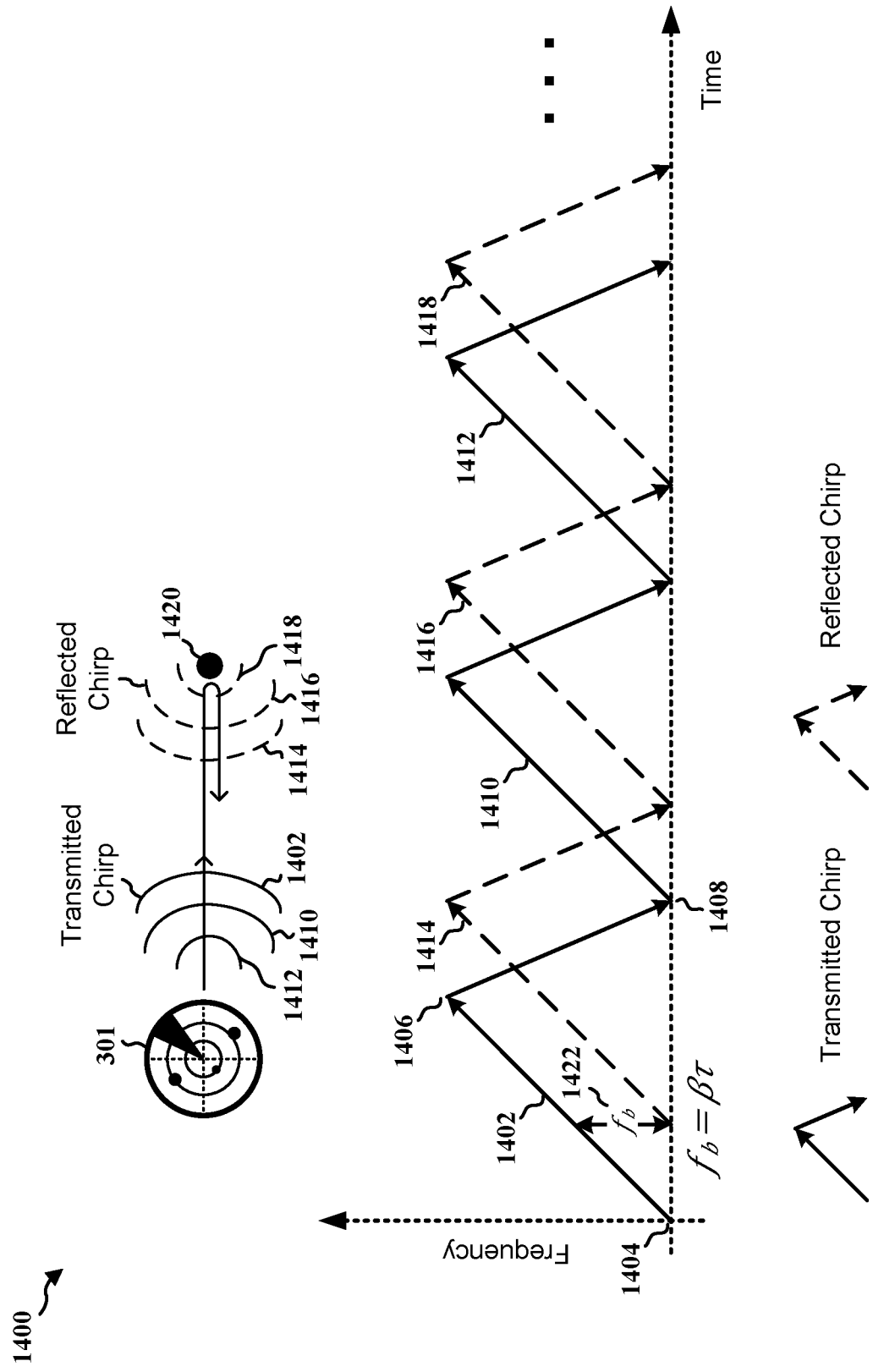
FIG. 14 illustrates example aspects of radar detection, in accordance with aspects presented herein.

Example aspects of radar detection are described in connection with FIG. 14 below. A radar component 301, which may also be referred to as a radar device, as described in connection with FIG. 3 and/or a radar-capable device as described in connection with FIG. 4, may transmit a radar transmission (e.g., which may also be referred to as radar waves, radar waveform, radar pulses, and/or radar signals, etc.) and measure reflections of the radar transmission to detect physical objects or physical surrounding. FIG. 14 is a diagram 1400 illustrating an example of frequency modulated continuous wave (FMCW) signals generated from a radar device 301 (e.g., an FMCW radar) that may be used to measure for a beam blockage in accordance with various aspects of the present disclosure. The radar device 301 may detect an object 1420 by transmitting a set of radar transmissions, which may be a set of chirp signals (or may also be referred to as a pulse signals), where each of the chirp signals may have a frequency that varies linearly (e.g., have a frequency sweeping) over a fixed period of time (e.g., over a sweep time) by a modulating signal. For example, as shown by the diagram 1400, a transmitted chirp 1402 may have a starting frequency at 1404 of a sinusoid. Then the frequency may be gradually (e.g., linearly) increased on the sinusoid until it reaches the highest frequency at 1406 of the sinusoid, and then the frequency of the signal may return to 1408 and another chirp 1410 may be transmitted in the same way. In other words, each chirp may include an increase in the frequency (e.g., linearly) and a drop in the frequency, such that the radar device 301 may transmit chirps sweeping in frequency.

After one or more chirps (e.g., chirps 1402, 1410, 1412, etc.) are transmitted by the radar device 301, the transmitted chirps may reach the object 1420 and reflect back to the radar device 301, such as shown by the reflected chirps 1414, 1416, and 1418, which may correspond to the transmitted chirps 1402, 1410, and 1412, respectively. As there may be a distance between the radar device 301 and the object 1420 and/or it may take time for a transmitted chirp to reach the object 1420 and reflect back to the radar device 301, a delay may exist between a transmitted chirp and its corresponding reflected chirp. The delay may be proportional to a range between the radar device 301 and the object 1420 (e.g., the further the target, the larger the delay and vice versa). Thus, the radar device 301 may be able to measure or estimate a distance between the radar device 301 and the object 1420 based on the delay. However, in some examples, it may not be easy for some devices to measure or estimate the distance based on the delay between a transmitted chirp and a reflected chirp.

In other examples, as an alternative, the radar device 301 may measure a difference in frequency between the transmitted chirp and the reflected chirp, which may also be proportional to the distance between the radar device 301 and the object 1420. In other words, as the frequency difference between the reflected chirp and the transmitted chirp increases with the delay, and the delay is linearly proportional to the range, the distance of the object 1420 from the radar device 301 may also be determined based on the difference in frequency. Thus, the reflected chirp from the object may be mixed with the transmitted chirp and down-converted to produce a beat signal ($f_b$) which may be linearly proportional to the range after demodulation. For example, the radar device 301 may determine a beat signal 1422 by mixing the transmitted chirp 1402 and its corresponding reflected chirp 1414. In some examples, a radar device may also be used to detect the velocity and direction of a using the FMCW. For example, an FMCW receiver may be able to identify the beat frequency/range based on a range spectrum. The FMCW receiver may also be able to identify the velocity based on a Doppler spectrum and/or the direction based on a direction of arrival (DoA) spectrum with multiple chirps.

Figure 4:
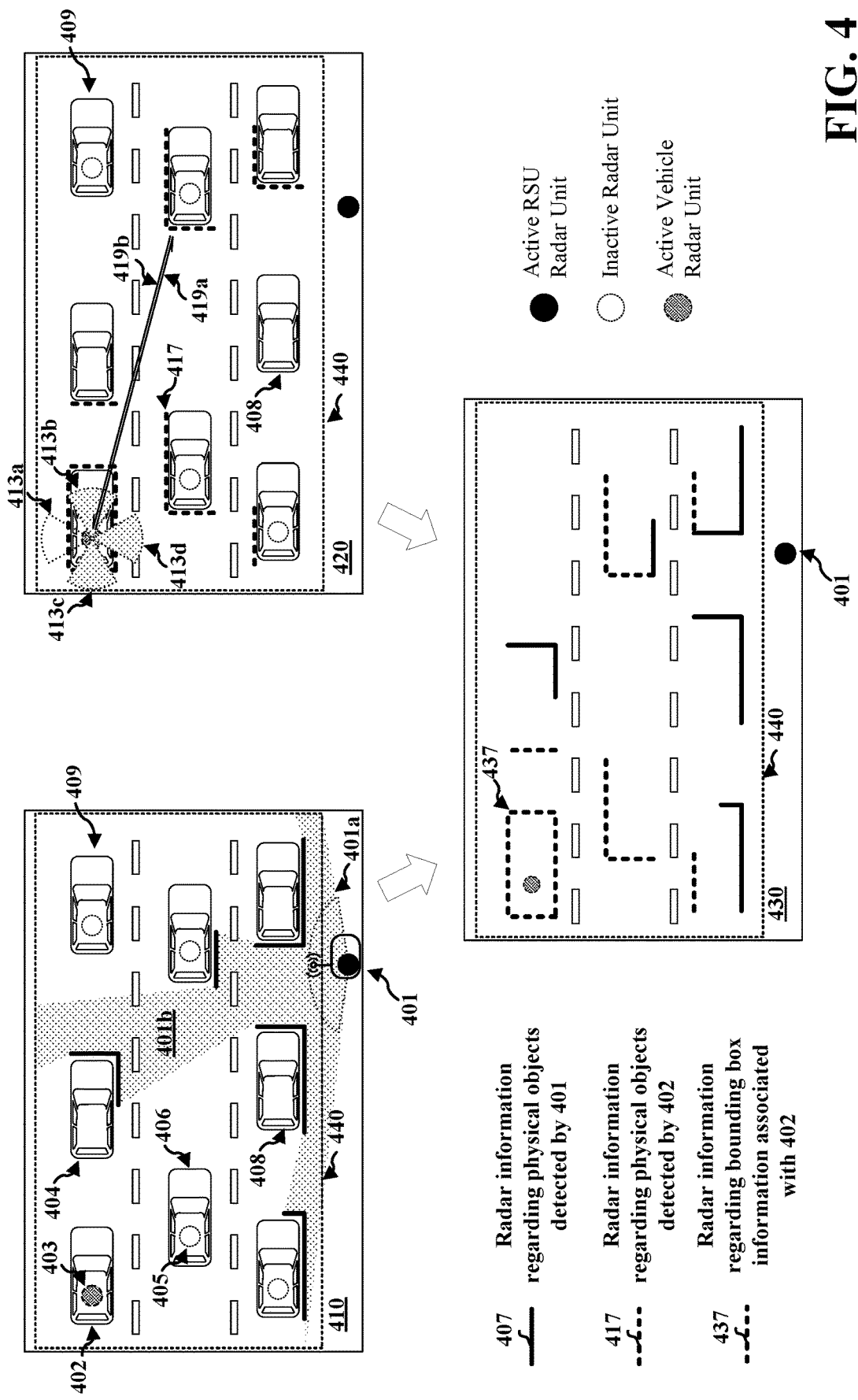
FIG. 4 illustrates an example JCR application involving an RSU and a radar-capable vehicle, in accordance with aspects presented herein.

FIG. 4 illustrates an example JCR application involving an RSU 401 and a radar-capable vehicle 402. FIG. 4 includes a first diagram 410, a second diagram 420, and a third diagram 430 illustrating a same region-of-interest 440. Diagrams 410, 420, and 430 further illustrate a set of vehicles (e.g., including vehicles 402, 404, 406, 408, and 409) in the region-of-interest. The vehicles (e.g., vehicles 402, 404, 406, 408, and 409) may be radar-capable, e.g., vehicle 402, vehicle 406, and vehicle 409, or may not be radar-capable, e.g., vehicle 404 and vehicle 408. The radar devices (e.g. radar devices 403 and 405) associated with the vehicles (e.g., vehicles 402 and 406) may be active (e.g., radar device 403) or inactive (e.g., radar device 405) as described below in relation to FIGS. 5 and 6. Although FIG. 4 illustrates an example involving a vehicular setting, the aspects presented herein are not limited to vehicular settings, and may be applied for other devices that have the capability to perform radar measurements and transmit a report to a requesting device, e.g., the RSU 401. Among other examples, the device may include a UE, a vulnerable road user (VRU). Similarly, the aspects described in connection with FIG. 4 are not limited to an RSU and the device that requests the radar information may be an RSU, a base station, an IAB node, another UE, etc.

Diagram 410 illustrates a set of radar information collected by the radar-capable RSU 401 performing a radar measurement associated with a radar beam 401a. The RSU 401 may determine a portion of the environment from measurement of radar signals transmitted at the RSU. Radar information 407 may be indicated by the solid lines in the diagram 410 illustrate the surfaces/presence of physical objects that may be identified by the radar measurement at the RSU 401. As illustrated in diagram 410, the radar information 407 collected by the RSU 401 may not include information for a set of vehicles (e.g., including vehicle 402 and vehicle 406) that are not in a LoS 401b of the RSU 401, and may not include information on sides of the vehicles detected by the RSU.

Diagram 420 illustrates a set of radar information 417 collected by the radar-capable vehicle 402 performing a radar measurement of reflections 419b of a radar signal 419a transmitted at the vehicle 402. In some aspects, radar signals may be transmitted at multiple transmission points associated with the vehicle. In other aspects, the radar signal may be from a single transmission point. In some aspects, the different transmission points may be considered as radar beams 413a, 413b, 413c, and 413d or directions for the radar signal. In some aspects, radar measurements may be taken using a subset of the transmission points or directions (e.g., using radar beams 413b, 413c, and 413d, but not 413a that may provide information regarding objects outside of the region-of-interest 440). The radar-capable vehicle 402 may determine physical objects, or surfaces (e.g., radar information 417) of physical objects that are not detected by the RSU 401 in the diagram 410 because they are not in the LoS 401b of the RSU 401. For example, the radar capable vehicle 402 may detect a set of bounding boxes or may identify surfaces such as the set of surfaces include in radar information 417 that make up part of a bounding box associated with vehicle 406. As illustrated in diagram 420, the radar information 417 collected by the radar-capable vehicle 402 may not include information for a set of vehicles (e.g., vehicle 408) that are not in a LoS of the radar-capable vehicle 402.

Diagram 430 illustrates a combination of the radar information 407 collected by the RSU 401 and the radar information 417 collected by the radar-capable vehicle 402. The combination of the radar information 407 and the radar information 417 represents more comprehensive information about the environment than is detectable solely from either of the radar measurements illustrated in diagrams 410 and 420. For example, while each of diagrams 410 and 420 illustrate that radar information for at least two vehicles is not captured by each of the radar-capable devices (e.g., vehicles 406 and 409 by RSU 401 or vehicles 408 and 409 by vehicle 402), diagram 430 illustrates that there is a single vehicle (e.g., vehicle 409) for which data is not captured. Additionally, the information (e.g., bounding boxes and/or surfaces) for at least some of the vehicles (e.g., vehicle 404) is improved by combining the radar measurement information from more than one radar-capable device.

Figure 5:
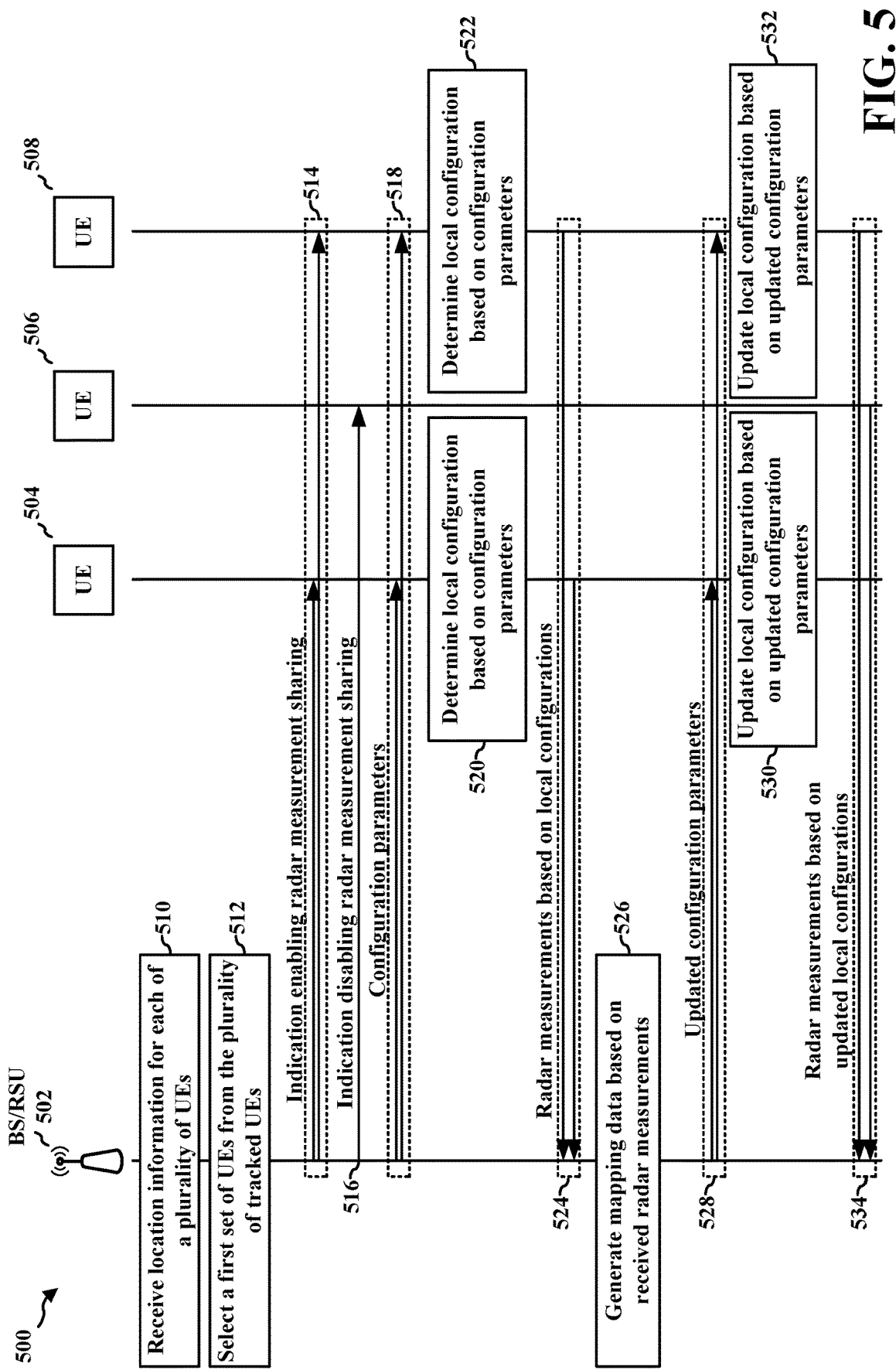
FIG. 5 is a call flow diagram illustrating a method for radar measurement sharing, in accordance with aspects presented herein.

FIG. 5 is a call flow diagram 500 illustrating a method for radar measurement sharing. FIG. 5 illustrates a base station (BS)/road side unit (RSU) 502 (or other network node) in communication with a set of radar-sensing-capable UEs 504, 506, and 508. In some aspects, one or more of the UEs may be associated with a vehicle, e.g., a component of a vehicle, connected to a vehicle, traveling with a vehicle, etc. In other aspects, one or more of the UEs may not be associated with a vehicle. The BS/RSU 502 may receive, at 510, location information for each of a plurality of UEs that may participate in radar measurement sharing. Location information, in some aspects, is received through at least one of a reflection of a radar signal, a sidelink message, or a collaborative mapping based on shared information from at least one additional device. The location may be identified as a latitude and longitude (e.g., a global positioning system (GPS)), a position relative to the BS/RSU 502, or a zone-based location.

The BS/RSU 502 may then select, at 512, a first set of one or more UEs from a plurality of UEs (e.g., including the UEs 504, 506, and 508) for the radar measurement sharing. Selecting the first set of one or more UEs may include selecting a set of UEs that are separated by at least a threshold distance from one or more of a network node (e.g., the BS/RSU 502) or from another UE in the first set of one or more UEs. For example, the BS/RSU 502 may select UE 504 and UE 508 to participate in radar measurement sharing. The first set of UEs may be selected to reduce a number of radar measurement sharing transmissions used to provide a more complete set of radar information (e.g., bounding boxes associated with a set of vehicles within a particular distance of the BS/RSU 520) than can be derived based on the BS/RSU measurements alone. As described above in relation to FIG. 4 and as will be described below in relation to FIG. 6, by selecting a subset of radar-capable vehicles in different locations and with different lines-of-sight a set of bounding boxes for most (or all) of the vehicles on the road can be generated at the BS/RSU 401/601 while reducing the number of radar measurement sharing transmissions compared to enabling radar measurement sharing at all the radar-capable devices in the area.

Based on the selection, at 512, of the first set of one or more UEs for the radar measurement sharing, the BS/RSU 502 may transmit, and the UEs 504 and 508 may receive, an indication enabling the radar measurement sharing 514 to each of the UEs in the first set of one or more UEs (e.g., UE 504 and UE 508). The BS/RSU 502 may further transmit an indication disabling radar measurement sharing 516 to each UE in a second set of one or more UEs that are not in the first set of one or more UEs. The indications 514 and 516 may be included in a unicast, groupcast, or broadcast transmission identifying the UEs to enable and/or disable (e.g., identifying participating UEs) for radar measurement sharing.

In addition to transmitting the indication enabling the radar measurement sharing 514, the BS/RSU 502 may also transmit, and the UEs 504 and 508 may receive, a first set of configuration parameters 518. The first set of configuration parameter 518 may include, in some aspects, a minimum radar measurement transmission rate, a maximum radar measurement transmission rate, a priority associated with the radar measurement transmission, a frequency range for the radar measurement transmission, a data rate, or a modulation and coding scheme associated with the radar measurement transmission. The minimum radar measurement transmission rate and the maximum radar measurement transmission rate may define a range of radar measurement transmission rates (e.g., update rates) at which the UEs with radar measurement sharing enabled (e.g., UEs 504 and 508) may transmit radar measurement data to the BS/RSU 502. The first set of configuration parameters 518 may be based on a set of network state parameters including at least one of a mean computation time per radar measurement transmission, or an amount of computation power for processing the radar measurement transmission at the BS/RSU 502.

Based on the indication enabling radar measurement sharing 514, the first set of configuration parameters 518, and network state information, the UE 504 may determine, at 520, a local configuration for transmitting radar measurement transmissions to the BS/RSU 502. Similarly, the UE 508 may determine, at 522, a local configuration for transmitting radar measurement transmissions to the BS/RSU 502 based on the indication enabling radar measurement sharing 514, the first set of configuration parameters 518, and the network state information. The local configurations for transmitting radar measurement transmissions to the BS/RSU 702 may include a radar measurement transmission rate. The network state information may include a measured congestion. The measure of congestion, in some aspects is at least one of a measured reference signal received power (RSRP), a channel busy ratio (CBR), a first number of UEs communicating with the wireless device (e.g., the BS/RSU 502), a second number of UEs participating in the radar measurement sharing, or a packet delay associated with communication between the UE and the wireless device (e.g., the BS/RSU 502).

In some aspects, the local configuration may further be determined based on a speed associated with the UE and at least one of a radar sensing precision or a radar sensing accuracy of a radar system associated with the UE. For example, a vehicle moving at a higher (or lower) speed may determine to use a higher (or lower) radar measurement transmission rate (e.g., an update rate) such that radar measurement information is transmitted from positions that are separated by a distance within a range of distances between an upper threshold distance and a lower threshold distance. The threshold distance, in some aspects, may be based on the radar sensing precision or the radar sensing accuracy of the radar system associated with the UE. For example, for a radar system with a precision of ±10 centimeters and an accuracy of ±30 centimeters, the threshold distance range may be between 10 centimeters and 30 centimeters such that radar measurement transmissions rate does not result in updates that reflect changes that are smaller than the radar precision and/or the radar accuracy.

After determining, at 520 and 522, the local configuration for transmitting radar measurement transmissions to the BS/RSU 502, the UE 504 and the UE 508 may transmit, and the BS/RSU 502 may receive, radar measurements based on the local configuration 524. The radar measurements based on the local configuration 524 may be transmitted by the UE 504 and the UE 508 at different rates. As discussed in relation to the determination at 520 and 522, the different transmission rates (update rates), in some aspects, are based on at least one of a measured congestion (or other network state information), a speed of the UE, a radar sensing precision of a radar system associated with the UE, or a radar sensing accuracy of a radar system associated with the UE. The radar measurements based on the local configuration 524 received from a particular UE may include bounding box information for objects detected by a radar system associated with the particular UE. Bounding box information is one example of radar data that may be transmitted to efficiently identify the location and size of objects, e.g., without sending each point identified by the radar measurements performed at the particular UE.

Figure 6:
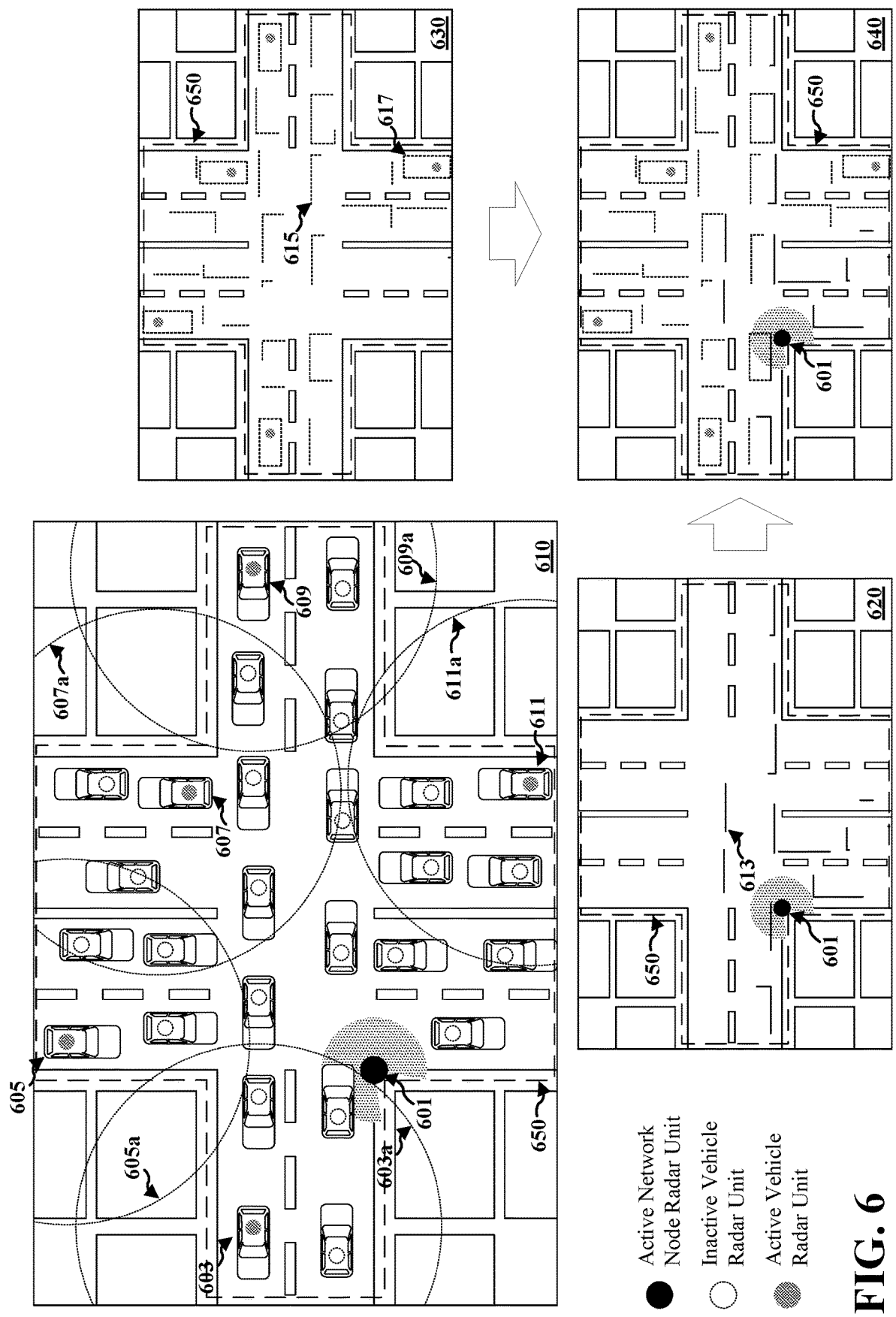
FIG. 6 illustrates an example JCR application in which multiple radar-capable vehicles participate in radar measurement sharing, in accordance with aspects presented herein.

The BS/RSU 502, at 526, may generate mapping data (e.g., an environment map) based on the radar measurements based on the local configuration 524 received from a plurality of UEs (e.g., UEs 504 and 508). For example, the BS/RSU 502 may receive information regarding a set of bounding boxes for objects (e.g., vehicles) identified by radar systems at each of a plurality of UEs (e.g., UE 504 and/or 508) and combine them into aggregated mapping data including the sets of bounding boxes identified by the BS/RSU 502 and each of the plurality of UEs (e.g., UEs 504 and/or 508). For example, referring to FIG. 4, based on receiving radar measurement information from UE 402, the RSU 401 may generate the mapping data reflected in diagram 430 by combining the radar information 407 and the radar information 417. Referring to FIG. 6 below, the RSU 601 may generate the mapping data illustrated in diagram 640 based on radar measurements performed at the RSU 601 (e.g., illustrated in diagram 620) and radar measurement information received from the radar-capable vehicles 603, 605, 607, 609, and 611 (e.g., illustrated in diagram 630).

Based on changing conditions, e.g., changing locations of the radar-capable vehicles or a changing network state, the BS/RSU 502 may determine a second, updated set of configuration parameters. The BS/RSU 502 may transmit, and enabled UEs (e.g., the UE 504 and the UE 508) may receive, updated configuration parameters 528 to UEs. The updated configuration parameters 528 may include an update to the minimum radar measurement transmission rate, the maximum radar measurement transmission rate, the priority associated with the radar measurement transmission, the frequency range for the radar measurement transmission, the data rate, or the modulation and coding scheme associated with the radar measurement transmission.

Based on the indication enabling radar measurement sharing 514, the second, updated set of configuration parameters 528, and current network state information, the UE 504 may determine, at 530, an updated local configuration for transmitting radar measurement transmissions to the BS/RSU 502. Similarly, the UE 508 may determine, at 532, an updated local configuration for transmitting radar measurement transmissions to the BS/RSU 502 based on the indication enabling radar measurement sharing 514, the updated, second set of configuration parameters 528, and the current network state information. The current network state information may include a current measured congestion. The current measure of congestion, in some aspects is at least one of a measured RSRP, a CBR, a first number of UEs communicating with the wireless device (e.g., the BS/RSU 502), a second number of UEs participating in the radar measurement sharing, or a packet delay associated with communication between the UE and the wireless device (e.g., the BS/RSU 502). In some aspects, the local configuration may further be determined based on a speed associated with the UE and at least one of a radar sensing precision or a radar sensing accuracy of a radar system associated with the UE as discussed above in relation to the determinations 520 and 522.

After determining, at 530 and 532, the local configuration for transmitting radar measurement transmissions to the BS/RSU 502, the UE 504 and the UE 508 may transmit, and the BS/RSU 502 may receive, radar measurements based on the local configuration 534. The radar measurements based on the updated local configuration 534 may be transmitted by the UE 504 and the UE 508 at different rates. As discussed in relation to the determination at 530 and 532, the different transmission rates (update rates), in some aspects, are based on at least one of a measured congestion (or other network state information), a speed of the UE, a radar sensing precision of a radar system associated with the UE, or a radar sensing accuracy of a radar system associated with the UE. The radar measurements based on the updated local configuration 534 received from a particular UE may include bounding box information for objects detected by a radar system associated with the particular UE. Bounding box information is one example of radar data that may be transmitted to efficiently identify the location and size of objects, e.g., without sending each point identified by the radar measurements performed at the particular UE.

FIG. 6 illustrates an example JCR system in which multiple radar-capable vehicles (e.g., vehicles 603, 605, 607, 609, and 611) participate in radar measurement sharing and/or reporting. As described in relation to the selection, at 512, of FIG. 5, the RSU 601 may select a first set of radar-capable vehicles (e.g., vehicles 603, 605, 607, 609, and 611) for which to enable radar measurement sharing. Diagram 610 illustrates RSU 601 and a set of radar-capable vehicles (including vehicles 603, 605, 607, 609, and 611) in a region-of-interest 650 including an intersection. Diagram 620 illustrates a set of surfaces (including surface 613) in the region-of-interest 650 identified by a radar measurement performed by the RSU 601 based on the vehicles illustrated in diagram 610. Diagram 630 illustrates a set of surfaces (including surface 615) in the region-of-interest 650 identified by radar measurements performed by the set of radar-capable vehicles 603, 605, 607, 609, and 611 based on the vehicles illustrated in diagram 610. In some aspects, each radar-capable vehicle additionally identifies a bounding box associated with the radar-capable vehicle (e.g., bounding box 617 associated with radar-capable vehicle 611).

Diagram 610 illustrates that the selected radar-capable vehicles (e.g., radar-capable vehicles 603, 605, 607, 609, and 611) may be separated by at least a threshold distance (indicated by thresholds 603a, 605a, 607a, 609a, and 611a) from one or more of a network node (e.g., the RSU 601) or from another vehicle (e.g., UE) in the first set of one or more radar-capable vehicles (e.g., UEs) 603, 605, 607, 609, and 611. In some aspects, a threshold distance may be applied to reduce redundant information, while in some aspects, no threshold distance (or a threshold distance equal to zero) is applied. The first set of radar-capable vehicles may be identified based on location information received for each of the vehicles (e.g., UEs) associated with the region-of interest. The location information may be received via at least one of a reflection of a radar signal, a sidelink message, or a collaborative mapping based on shared information from at least one additional device (e.g., vehicle, UE, RSU, base station, etc.).

Diagram 640 illustrates combined radar measurement information based on the radar information collected by the RSU 601 as illustrated in diagram 620 and the radar information collected by the radar-capable vehicles 603, 605, 607, 609, and 611 as illustrated in diagram 630. In other aspects, a smaller or larger threshold distance between vehicles and/or UEs may be used such that a larger or smaller number of vehicles are enabled for radar measurement sharing to provide more or less detailed radar measurement information. The threshold distance may be determined based on a set of network state parameters including at least one of a mean computation time per radar measurement transmission, or an amount of computation power for processing the radar measurement transmission.

Figure 7:
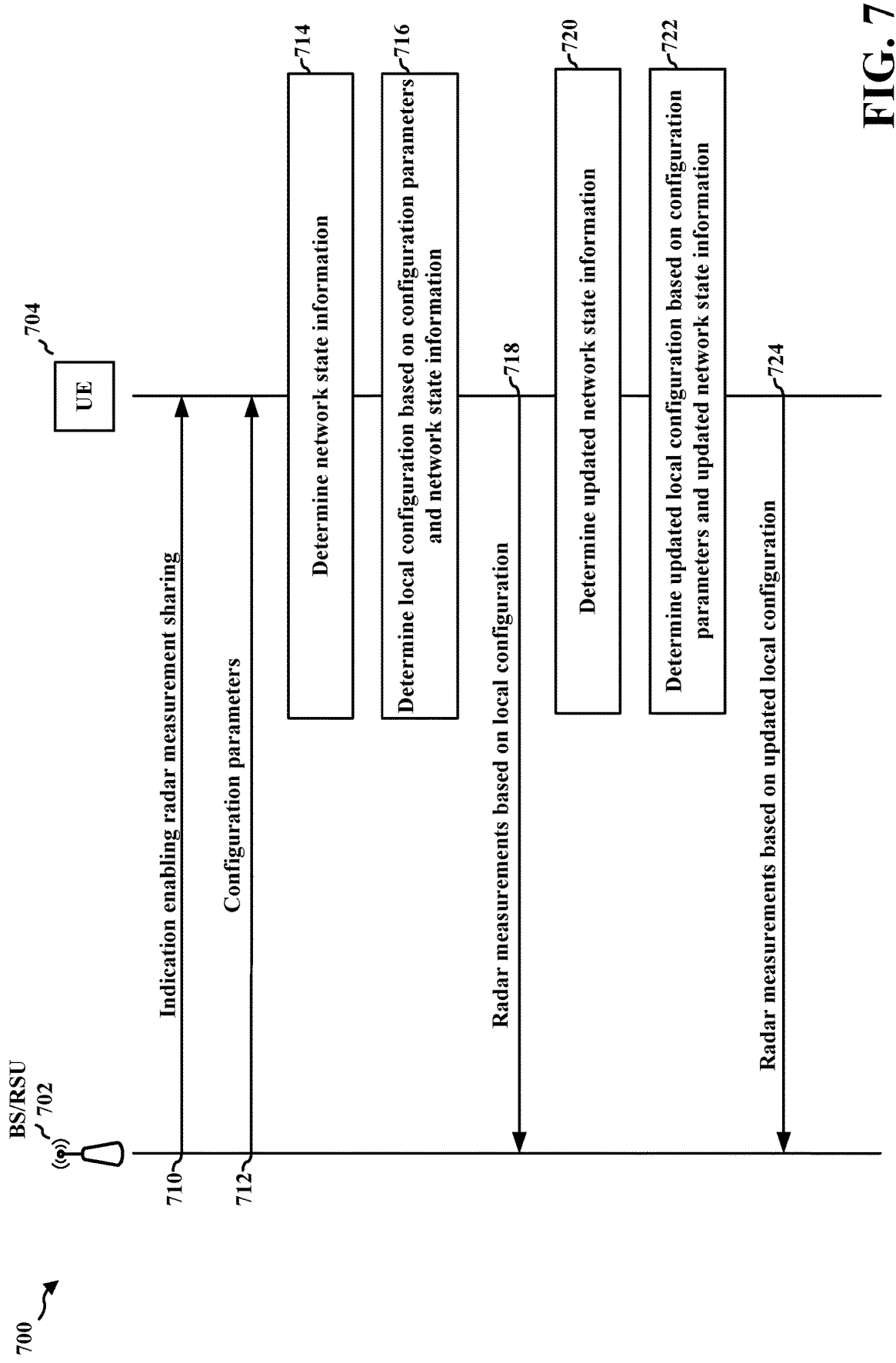
FIG. 7 is a call flow diagram illustrating a UE updating a local radar measurement transmission configuration based on updated network state information, in accordance with aspects presented herein.

FIG. 7 is a call flow diagram 700 illustrating a UE 704 updating a local radar measurement transmission configuration based on updated network state information. As described above in relation to FIG. 5, the BS/RSU 702 may transmit, and the UE 704 may receive, an indication enabling the radar measurement sharing 510. The indication 510 may be included in a unicast, groupcast, or broadcast transmission identifying the UEs to enable and/or disable (e.g., identifying participating UEs) for radar measurement sharing.

In addition to transmitting the indication enabling the radar measurement sharing 710, the BS/RSU 702 may also transmit, and the UE 704 may receive, a first set of configuration parameters 712. The first set of configuration parameter 712 may include, in some aspects, a minimum radar measurement transmission rate, a maximum radar measurement transmission rate, a priority associated with the radar measurement transmission, a frequency range for the radar measurement transmission, a data rate, or a modulation and coding scheme associated with the radar measurement transmission. The minimum radar measurement transmission rate and the maximum radar measurement transmission rate may define a range of radar measurement transmission rates (e.g., update rates) at which the UEs with radar measurement sharing enabled (e.g., UE 704) may transmit radar measurement data to the BS/RSU 702. The first set of configuration parameters 712 may be based on a set of network state parameters including at least one of a mean computation time per radar measurement transmission, or an amount of computation power for processing the radar measurement transmission at the BS/RSU 702.

The UE 704 may, based on receiving the indication enabling the radar measurement sharing 710, determine, at 714, network state information. The network state information may include a measured congestion. The measure of congestion, in some aspects is at least one of a measured RSRP, a CBR, a first number of UEs communicating with the wireless device (e.g., the BS/RSU 702), a second number of UEs participating in the radar measurement sharing, or a packet delay associated with communication between the UE and the wireless device (e.g., the BS/RSU 702). The UE 704 may also determine, at 714, additional information related to the radar measurement sharing such as a speed associated with the UE and at least one of a radar sensing precision or a radar sensing accuracy of a radar system associated with the UE.

Based on the indication enabling radar measurement sharing 710, the first set of configuration parameters 712, and the network state information determined at 714, the UE 704 may determine, at 716, a local configuration for transmitting radar measurement transmissions to the BS/RSU 702. The local configuration for transmitting radar measurement transmissions to the BS/RSU 702 may include a radar measurement transmission rate. The radar measurement transmission rate may be related to a measured congestion such that the radar measurement transmission rate associated with the local configuration for higher (or lower) measured congestion is lower (or higher) within the range of radar measurement transmission rates indicated by the first set of configuration parameters. Additionally, as described above in relation to FIG. 5, the local configuration at the UE 704 may further be based on a current speed of the UE 704 and an accuracy or precision of a radar system associated with the UE 704.

After determining, at 716, the local configuration for transmitting radar measurement transmissions to the BS/RSU 702, the UE 704 may transmit, and the BS/RSU 702 may receive, radar measurements based on the local configuration 718. The radar measurements based on the local configuration 718 received from (or transmitted by) the UE 704 may include bounding box information for objects detected by a radar system associated with the particular UE. Bounding box information is one example of radar data that may be transmitted to efficiently identify the location and size of objects, e.g., without sending each point identified by the radar measurements performed at the particular UE.

The BS/RSU 702 may, as described above in relation to FIG. 5, generate mapping data (e.g., an environment map) based on the radar measurements based on the local configuration 718 received from at least UE 704. For example, the BS/RSU 702 may receive information regarding a set of bounding boxes for objects (e.g., vehicles) identified by radar systems at each of a plurality of UEs. For example, referring to FIGS. 4 and 6, based on receiving radar measurement information from UE 402, the RSU 401 may generate the mapping data reflected in diagram 430 and the RSU 601 may generate the mapping data illustrated in diagram 640 based on radar measurements performed at the RSU 601 (e.g., illustrated in diagram 620) and radar measurement information received from the radar-capable vehicles 603, 605, 607, 609, and 611 (e.g., illustrated in diagram 630).

The UE 704 may, determine, at 720, updated network state information. The updated network state information may include at least one of a measured RSRP, a CBR, a first number of UEs communicating with the wireless device (e.g., the BS/RSU 702), a second number of UEs participating in the radar measurement sharing, or a packet delay associated with communication between the UE and the wireless device (e.g., the BS/RSU 702). The UE 704 may also determine, at 714, updated additional information related to the radar measurement sharing such as a speed associated with the UE and at least one of a radar sensing precision or a radar sensing accuracy of a radar system associated with the UE. The rate at which the UE 704 determines updated network state information may be indicated in the first set of configuration parameters or may be based on other applications or operations at the UE 704. For example, an RSRP or a CBR may be measured for sidelink communication with a first frequency and/or the first set of configuration parameters may indicate a second frequency for determining state information. In some aspects, the first set of configuration parameters may include a plurality of different frequencies for updating a plurality of different network state information and/or other information related to the radar measurement sharing based on the speed at which changes to the network state information or other information related to the radar measurement sharing are likely to occur.

Based on determining, at 720, the updated network state information the UE 704 may determine, at 722, an updated local configuration for transmitting radar measurement transmissions to the BS/RSU 702 based on the first set of configuration parameters 712, and the network state information determined at 714. The updated local configuration for transmitting radar measurement transmissions to the BS/RSU 702 may include an updated radar measurement transmission rate. In some aspects, determining, at 722, the updated local configuration for transmitting radar measurement transmissions may be based on an additional determination that the updated network state information indicates a change from the network state information determined at 714 that is above a threshold. For example, based on detecting an increase (or decrease) in a measured congestion, the updated radar measurement transmission rate for transmitting radar measurement transmissions to the BS/RSU 702 may be decreased (or increased) from the radar measurement transmission rate determined at 716. Similarly, the updated radar measurement transmission rate may be decreased (or increased) from the radar measurement transmission rate associated with the local configuration determined at 716 based on a decreased (or increased) speed associated with the UE 704.

After determining, at 722, the local configuration for transmitting radar measurement transmissions to the BS/RSU 702, the UE 704 may transmit, and the BS/RSU 702 may receive, radar measurements based on the updated local configuration 724. The radar measurements based on the updated local configuration 724 received from (or transmitted by) the UE 704 may include bounding box information for objects detected by a radar system associated with the particular UE. Bounding box information is one example of radar data that may be transmitted to efficiently identify the location and size of objects, e.g., without sending each point identified by the radar measurements performed at the particular UE.

The BS/RSU 702 may, as described above in relation to FIG. 5, generate mapping data (e.g., an environment map) based on the radar measurements based on the updated local configuration 724 received from at least UE 704. For example, the BS/RSU 702 may receive information regarding a set of bounding boxes for objects (e.g., vehicles) identified by radar systems at each of a plurality of UEs. For example, referring to FIGS. 4 and 6, based on receiving radar measurement information from UE 402, the RSU 401 may generate the mapping data reflected in diagram 430 and the RSU 601 may generate the mapping data illustrated in diagram 640 based on radar measurements performed at the RSU 601 (e.g., illustrated in diagram 620) and radar measurement information received from the radar-capable vehicles 603, 605, 607, 609, and 611 (e.g., illustrated in diagram 630).

Figure 8:
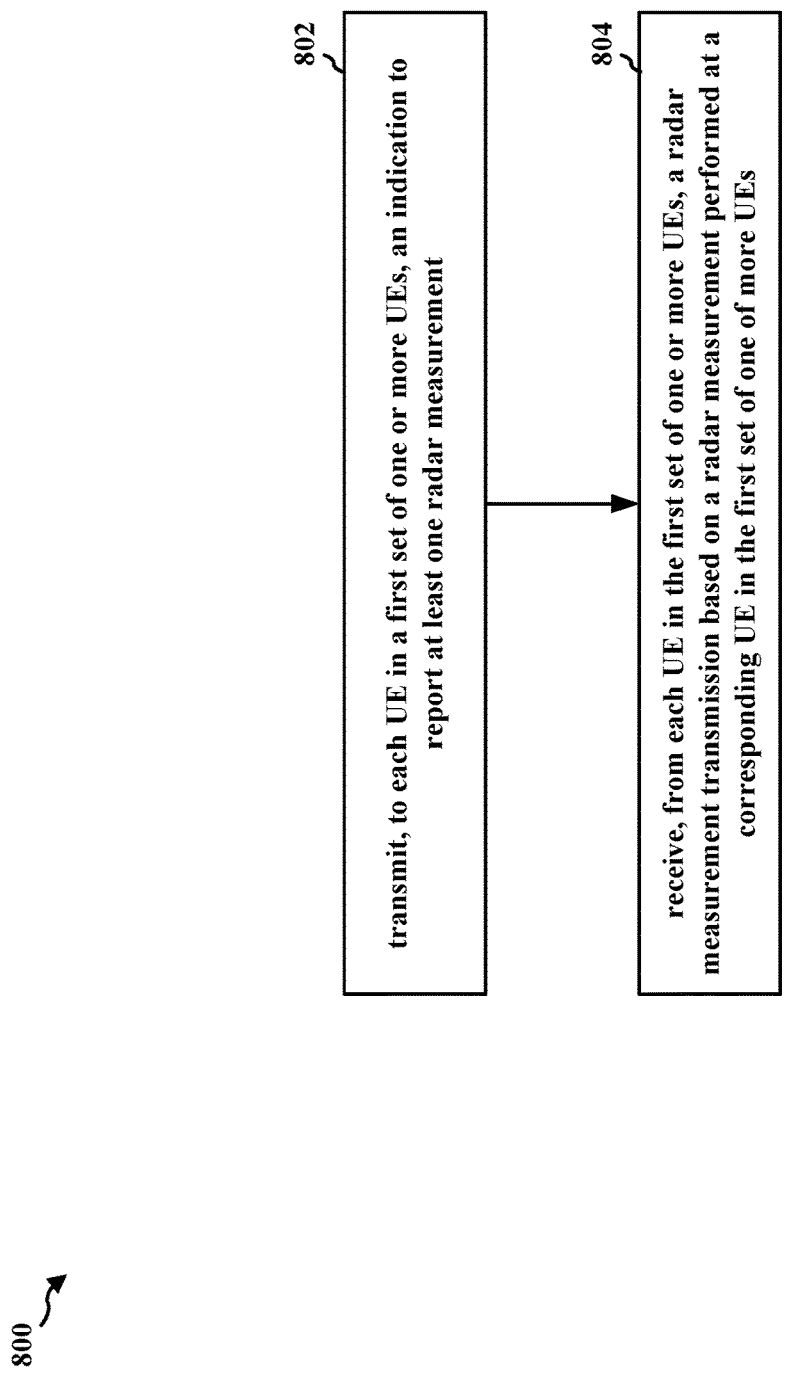
FIG. 8 is a flowchart of a method of wireless communication, in accordance with aspects presented herein.

FIG. 8 is a flowchart 800 of a method of wireless communication. The method may be performed by a base station (or RSU) (e.g., the base station 102/180, 502, or 702; the RSU 401, 502, 601, or 702; the apparatus 1302). At 802, the base station may transmit, and each UE in a first set of one or more UEs may receive, an indication to report at least one radar measurement (e.g., an indication enabling the radar measurement sharing at the UE). In some aspects, the indication enabling the radar measurement sharing at the UE may be included in a unicast, groupcast, or broadcast transmission identifying the UEs to enable and/or disable (e.g., identifying participating UEs) for radar measurement sharing. For example, referring to FIGS. 5 and 7, the BS/RSU 502 (and the BS/RSU 702) may transmit the indication enabling the radar measurement sharing 514 (and 710) to the first set of UEs (e.g., the UEs 504 and 508 or UE 704). For example, 802 may be performed by radar-capable-device selection component 1340.

In some aspects, transmitting, at 802, the indication to report at least one radar measurement (e.g., the indication enabling the radar measurement sharing at the UE) may include transmitting, to each UE in the first set of one or more UEs, a first set of configuration parameters for the radar measurement reporting. The first set of configuration parameter may include, in some aspects, a minimum radar measurement report rate, a maximum radar measurement report rate, a priority associated with the radar measurement report, a frequency range associated with a transmission of the radar measurement report, a data rate, or a modulation and coding scheme associated with a transmission of the radar measurement report. The minimum radar measurement report rate and the maximum radar measurement report rate may define a range of radar measurement report rates (e.g., update rates) at which the UEs with radar measurement sharing enabled may transmit radar measurement reports (e.g., data) to the base station. The first set of configuration parameters may be based on a set of network state parameters including at least one of a mean computation time per radar measurement report, or an amount of computation power for processing the radar measurement report at the base station. For example, referring to FIGS. 5 and 7, the BS/RSU 502 (or 702) may transmit a first set of configuration parameters 518 (or 712).

In some aspects, the base station may select the first set of one or more UEs from a plurality of UEs for a radar measurement sharing (e.g., to participate in a radar measurement sharing operation with the base station). In some aspects, the base station receives location information for each of the plurality of UEs and the selection may be based on the location information. For example, in some aspects, selecting the first set of one or more UEs from the plurality of UEs includes selecting a set of UEs that are separated by at least a threshold distance from one or more of the base station a network node or from another UE in the first set of one or more UEs. The location information may be received through at least one of a reflection of a radar signal, a sidelink message, or a collaborative mapping based on shared information from at least one additional device. For example, referring to FIGS. 5 and 6, the BS/RSU 502 or the RSU 601 may select a first set of radar-capable devices (e.g., the UEs 504 and 508 or radar-capable vehicles 603, 605, 607, 609, and 611) and, as illustrated in FIG. 6, the radar-capable devices may be separated by a threshold distance indicated by threshold 603*a*, 605*a*, 607*a*, 609*a*, and 611*a*.

Finally, at 804, the base station may receive, from each UE in the first set of one or more UEs, a radar measurement report based on a radar measurement performed at a corresponding UE in the first set of one of more UEs. For example, 804 may be performed by radar measurement sharing component 1342. The radar measurements transmissions may be received at the base station from different UEs in the first set of UEs at different rates. The radar measurements received from a particular UE may include bounding box information for objects detected by a radar system (or other object-detection systems) associated with the particular UE. Bounding box information is one example of radar data that may be transmitted to efficiently identify the location and size of objects, e.g., without sending each point identified by the radar measurements performed at the particular UE.

Figure 9:
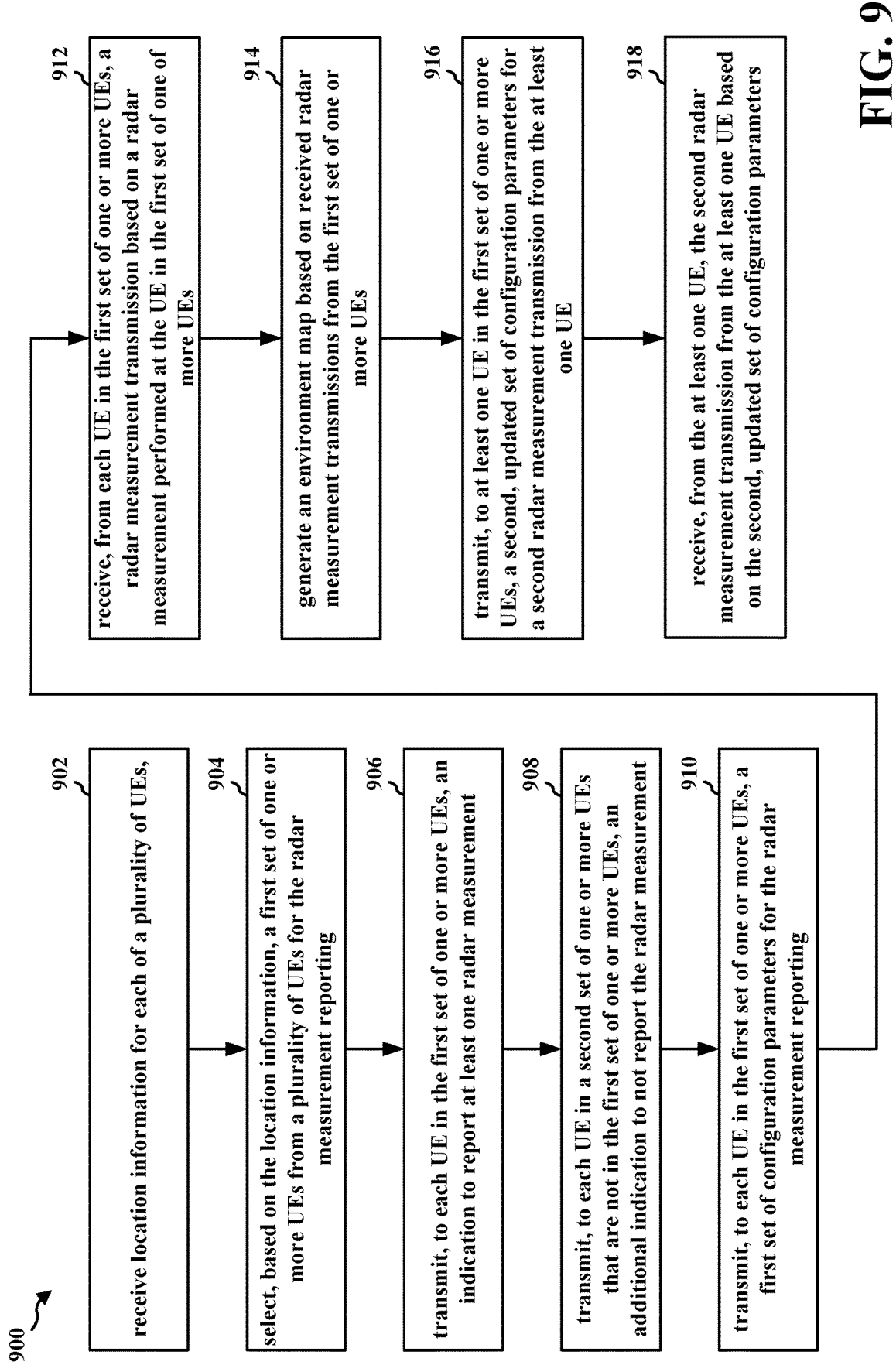
FIG. 9 is a flowchart of a method of wireless communication, in accordance with aspects presented herein.

FIG. 9 is a flowchart 900 of a method of wireless communication. The method may be performed by a base station (or RSU) (e.g., the base station 102/180, 502, or 702; the RSU 401, 502, 601, or 702; the apparatus 1302). At 902, the base station may receive location information for each of a plurality of UEs. The location information may be received through at least one of a reflection of a radar signal, a sidelink message, or a collaborative mapping based on shared information from at least one additional device. For example, referring to FIG. 5, the BS/RSU 502 may receive, at 510, location information for each of a plurality of UEs. For example, 902 may be performed by radar-capable-device selection component 1340.

At 904, the base station may select a first set of one or more UEs from a plurality of UEs for a radar measurement reporting (e.g., to participate in a radar measurement sharing operation with the base station). For example, 904 may be performed by radar-capable-device selection component 1340. In some aspects, the base station receives location information for each of the plurality of UEs and the selection may be based on the location information. For example, in some aspects, selecting the first set of one or more UEs from the plurality of UEs includes selecting a set of UEs that are separated by at least a threshold distance from one or more of the base station a network node or from another UE in the first set of one or more UEs. For example, referring to FIGS. 5 and 6, the BS/RSU 502 or the RSU 601 may select a first set of radar-capable devices (e.g., the UEs 504 and 508 or radar-capable vehicles 603, 605, 607, 609, and 611) and, as illustrated in FIG. 6, the radar-capable devices may be separated by a threshold distance indicated by threshold 603*a*, 605*a*, 607*a*, 609*a*, and 611*a*.

At 906, the base station may transmit, and each UE in the first set of one or more UEs may receive, an indication to report at least one radar measurement (e.g., an indication enabling the radar measurement sharing at the UE). In some aspects, the indication to report at least one radar measurement (e.g., the indication enabling the radar measurement sharing at the UE) may be included in a unicast, groupcast, or broadcast transmission identifying the UEs to enable and/or disable (e.g., identifying participating UEs) for radar measurement reporting. For example, referring to FIGS. 5 and 7, the BS/RSU 502 (and the BS/RSU 702) may transmit the indication enabling the radar measurement sharing 514 (and 710) to the first set of UEs (e.g., the UEs 504 and 508 or UE 704). For example, 906 may be performed by radar-capable-device selection component 1340.

The base station, at 908, may transmit, to each UE in a second set of one or more UEs that are disjoint from (e.g., does not include UEs that are in) the first set of one or more UEs, an additional indication to refrain from reporting radar measurement. In some aspects, the indication to refrain from reporting the radar measurement at the UE may be included in a unicast, groupcast, or broadcast transmission identifying the UEs to enable and/or disable (e.g., identifying participating UEs) for radar measurement reporting. For example, referring to FIG. 5, the BS/RSU 502 may transmit the indication disabling the radar measurement sharing 516 to the second set of UEs (e.g., the UE 506). For example, 908 may be performed by radar-capable-device selection component 1340.

At 910, the base station may transmit, to each UE in the first set of one or more UEs, a first set of configuration parameters for the radar measurement reporting. The first set of configuration parameters may include, in some aspects, a minimum radar measurement report rate, a maximum radar measurement report rate, a priority associated with the radar measurement report, a frequency range associated with a transmission of the radar measurement report, a data rate, or a modulation and coding scheme associated with a transmission of the radar measurement report. The minimum radar measurement report rate and the maximum radar measurement report rate may define a range of radar measurement report rates (e.g., update rates) at which the UEs with radar measurement sharing enabled may transmit radar measurement reports (e.g., data) to the base station. The first set of configuration parameters may be based on a set of network state parameters including at least one of a mean computation time per radar measurement report, or an amount of computation power for processing the radar measurement report at the base station. For example, referring to FIGS. 5 and 7, the BS/RSU 502 (or 702) may transmit a first set of configuration parameters 518 (or 712).

For example, 910 may be performed by radar-capable-device selection component 1340.

At 912, the base station may receive, from each UE in the first set of one or more UEs, a radar measurement report based on a radar measurement performed at a corresponding UE in the first set of one of more UEs. For example, 912 may be performed by radar measurement sharing component 1342. Receiving the radar measurement reports may include receiving a first radar measurement transmission, from a first UE, based on a first (local) configuration for the radar measurement that is based on the first set of configuration parameters, and receiving a second radar measurement transmission, from a second UE, based on a different, second (local) configuration for the radar measurement that is based on the first set of configuration parameters. The radar measurements received from a particular UE may include bounding box information for objects detected by a radar system (or other object-detection systems) associated with the particular UE. Bounding box information is one example of radar data that may be transmitted to efficiently identify the location and size of objects, e.g., without sending each point identified by the radar measurements performed at the particular UE.

At 914, the base station may generate an environment map based on received radar measurement reports from the first set of one or more UEs. For example, 914 may be performed by mapping component 1344. For example, the base station may receive information regarding a set of bounding boxes for objects (e.g., vehicles) identified by radar systems at each of the first set of one or more UEs. The base station may aggregate the received radar measurement information from the UEs in the first set of UEs to generate the environmental map. For example, referring to FIG. 4, based on receiving radar measurement information from UE 402, the RSU 401 may generate the mapping data reflected in diagram 430. Referring to FIG. 6 below, the RSU 601 may generate the mapping data illustrated in diagram 640 based on radar measurements performed at the RSU 601 (e.g., illustrated in diagram 620) and radar measurement information received from the radar-capable vehicles 603, 605, 607, 609, and 611 (e.g., illustrated in diagram 630).

At 916, the base station may transmit, to at least one UE in the first set of one or more UEs, a second, updated set of configuration parameters for a second radar measurement report from the at least one UE. The second, updated set of configuration parameters may include, in some aspects, an update to one or more of the minimum radar measurement report rate, the maximum radar measurement report rate, the priority associated with the radar measurement report, the frequency range associated with a transmission of the radar measurement report, the data rate, or the modulation and coding scheme associated with a transmission of the radar measurement report. The second, updated set of configuration parameters may be based on detecting a change to the set of network state parameters including at least one of a change to a mean computation time per radar measurement report, or a change to an amount of computation power for processing the radar measurement report at the base station. For example, referring to FIG. 5, the BS/RSU 502 may transmit the updated configuration parameters 528 to UEs 504 and 508. For example, 916 may be performed by radar-capable-device selection component 1340.

Finally, at 918, the base station may receive, from the at least one UE, the second radar measurement report from the at least one UE based on the second, updated set of configuration parameters. For example, 918 may be performed by radar measurement sharing component 1342. As described above, if the at least one UE includes more than one UE, the radar measurement reports may be received at the base station from different UEs in the first set of UEs at different rates. The radar measurements received from a particular UE may include bounding box information for objects detected by a radar system (or other object-detection systems) associated with the particular UE. Bounding box information is one example of radar data that may be transmitted to efficiently identify the location and size of objects, e.g., without sending each point identified by the radar measurements performed at the particular UE. The radar measurement reports received, at 918, may be used to generate an environment map as described above in relation to generating, at 914, the environment map.

Figure 10:
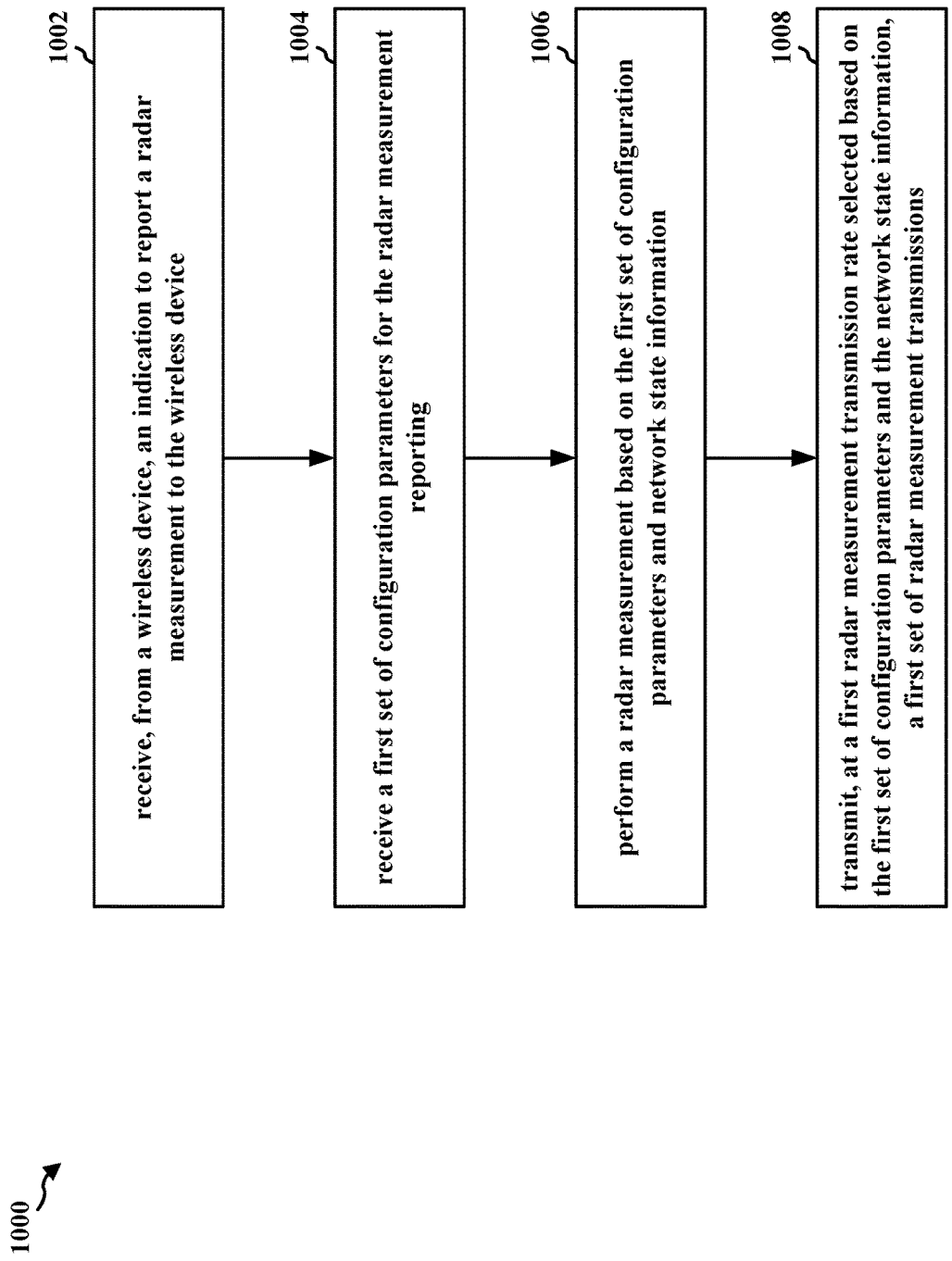
FIG. 10 is a flowchart of a method of wireless communication, in accordance with aspects presented herein.

FIG. 10 is a flowchart 1000 of a method of wireless communication. The method may be performed by a UE (e.g., a radar-capable device or vehicle) (e.g., e.g., the UE 104, 504, 508, or 704; the radar-capable vehicle 603, 605, 607, 609, and 611; the apparatus 1202). At 1002, the UE may receive, from a wireless device (e.g., a base station), an indication to report a radar measurement to the wireless device (e.g., an indication enabling the radar measurement sharing at the UE). In some aspects, the indication enabling the radar measurement sharing at the UE may be included in a unicast, groupcast, or broadcast transmission identifying the UEs to enable and/or disable (e.g., identifying participating UEs) for radar measurement sharing. For example, referring to FIGS. 5 and 7, the UEs 504 and 508 (and the UE 704) may receive the indication enabling the radar measurement sharing 514 (and 710) from the BS/RSU 502 (and 702). For example, 1002 may be performed by radar measurement sharing component 1240.

At 1004, the UE may receive, from the base station, a first set of configuration parameters for the radar measurement reporting. The first set of configuration parameter may include, in some aspects, a minimum radar measurement report rate, a maximum radar measurement report rate, a priority associated with the radar measurement report, a frequency range associated with a transmission of the radar measurement report, a data rate, or a modulation and coding scheme associated with a transmission of the radar measurement report. The minimum radar measurement report rate and the maximum radar measurement report transmission rate may define a range of radar measurement report rates (e.g., update rates) at which the UEs with radar measurement sharing enabled may transmit radar reports (e.g., data) to the base station. The first set of configuration parameters may be based on a set of network state parameters including at least one of a mean computation time per radar measurement report, or an amount of computation power for processing the radar measurement report at the base station. For example, referring to FIGS. 5 and 7, the UEs 504 and 508 (and the UE 704) may receive the first set of configuration parameters 518 (and 712) from the BS/RSU 502 (and 702).

At 1006, the UE may perform a radar measurement based on the first set of configuration parameters and network state information. For example, 1006 may be performed by radar measurement component 1242. The radar measurement may be performed by one or more devices associated with the UE. In some aspects, the radar measurements may further incorporate additional sensor data in generating radar measurement information. For example, referring to FIGS. 4 and 6, the radar-capable vehicle 402 or the radar-capable vehicles 603, 605, 607, 609, and 611 perform a set of radar measurements identifying radar information 417 including surfaces (e.g., surface 615) or bounding boxes 437 or 617.

Finally, at 1008, the UE may transmit, at a first radar measurement report rate selected based on the first set of configuration parameters and the network state information, a first set of radar measurement transmissions. For example, 1008 may be performed by radar measurement sharing component 1240. The radar measurements received from a particular UE may include bounding box information for objects detected by a radar system (or other object-detection systems) associated with the particular UE. Bounding box information is one example of radar data that may be transmitted to efficiently identify the location and size of objects, e.g., without sending each point identified by the radar measurements performed at the particular UE. For example, 1006 may be performed by radar measurement sharing component 1240.

Figure 11:
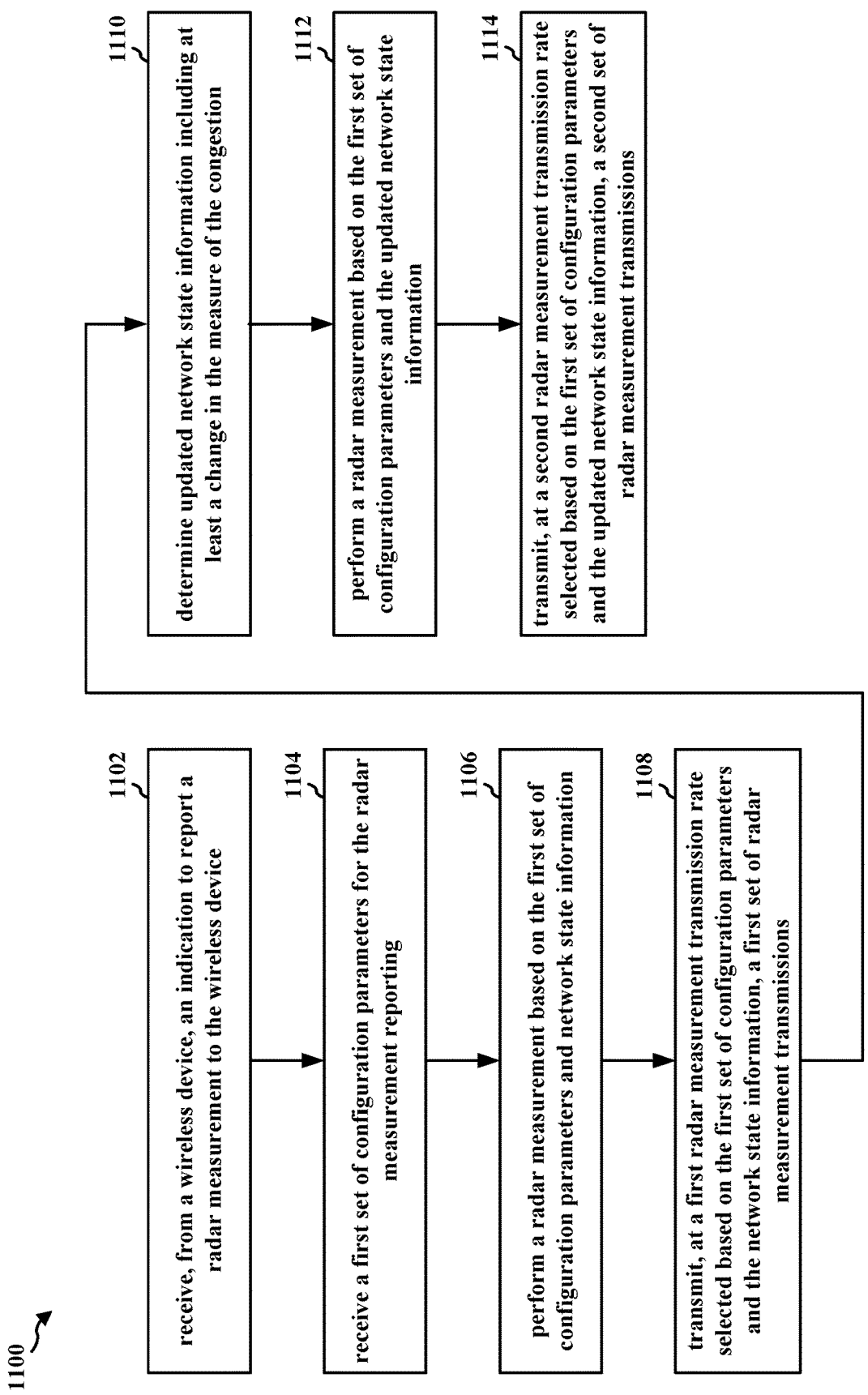
FIG. 11 is a flowchart of a method of wireless communication, in accordance with aspects presented herein.

FIG. 11 is a flowchart 1100 of a method of wireless communication. The method may be performed by a UE (e.g., a radar-capable device or vehicle) (e.g., e.g., the UE 104, 504, 508, or 704; the radar-capable vehicle 603, 605, 607, 609, and 611; the apparatus 1202). At 1102, the UE may receive, from a wireless device (e.g., a base station), an indication to report a radar measurement to the wireless device (e.g., an indication enabling the radar measurement sharing at the UE). In some aspects, the indication enabling the radar measurement sharing at the UE may be included in a unicast, groupcast, or broadcast transmission identifying the UEs to enable and/or disable (e.g., identifying participating UEs) for radar measurement sharing. For example, referring to FIGS. 5 and 7, the UEs 504 and 508 (and the UE 704) may receive the indication enabling the radar measurement sharing 514 (and 710) from the BS/RSU 502 (and 702). For example, 1102 may be performed by radar measurement sharing component 1240.

At 1104, the UE may receive, from the base station, a first set of configuration parameters for the radar measurement reporting. For example, 1104 may be performed by radar measurement sharing component 1240. The first set of configuration parameter may include, in some aspects, a minimum radar measurement report rate, a maximum radar measurement report rate, a priority associated with the radar measurement report, a frequency range for the radar measurement report, a data rate, or a modulation and coding scheme associated with the radar measurement report. The minimum radar measurement report rate and the maximum radar measurement report rate may define a range of radar measurement report rates (e.g., update rates) at which the UEs with radar measurement sharing enabled may transmit radar reports (e.g., data) to the base station. The first set of configuration parameters may be based on a set of network state parameters including at least one of a mean computation time per radar measurement report, or an amount of computation power for processing the radar measurement report at the base station. For example, referring to FIGS. 5 and 7, the UEs 504 and 508 (and the UE 704) may receive the first set of configuration parameters 518 (and 712) from the BS/RSU 502 (and 702).

At 1106, the UE may perform a radar measurement based on the first set of configuration parameters and network state information. For example, 1106 may be performed by radar measurement component 1242. In order to perform the radar measurement, the UE may determine network state information relating to a measure of congestion including at least one of a measured RSRP, a CBR, a first number of UEs communicating with the wireless device (e.g., the base station), a second number of UEs participating in the radar measurement sharing, or a packet delay associated with communication between the UE and the wireless device (e.g., the base station). The UE may also determine additional information related to the radar measurement sharing such as a speed associated with the UE and at least one of a radar sensing precision or a radar sensing accuracy of a radar system associated with the UE. The radar measurement may be performed by one or more devices associated with the UE. In some aspects, the radar measurements may further incorporate additional sensor data in generating radar measurement information. For example, referring to FIGS. 4 and 6, the radar-capable vehicle 402 or the radar-capable vehicles 603, 605, 607, 609, and 611 perform a set of radar measurements identifying radar information 417 including surfaces (e.g., surface 615) or bounding boxes 437 or 617.

At 1108, the UE may transmit, at a first radar measurement report rate selected based on the first set of configuration parameters and the network state information, a first set of radar measurement reports. For example, 1108 may be performed by radar measurement sharing component 1240. The radar measurements received from a particular UE may include bounding box information for objects detected by a radar system (or other object-detection systems) associated with the particular UE. Bounding box information is one example of radar data that may be transmitted to efficiently identify the location and size of objects, e.g., without sending each point identified by the radar measurements performed at the particular UE.

In some aspects the UE may determine, at 1110, updated network state information including at least a change in the measure of the congestion. For example, 1110 may be performed by radar measurement sharing component 1240. The updated network state information may include an update to at least one of the measured RSRP, the CBR, the first number of UEs communicating with the wireless device (e.g., a base station), the second number of UEs participating in the radar measurement sharing, or the packet delay associated with communication between the UE and the wireless device (e.g., the base station). The UE may also determine, at 1110, updated additional information related to the radar measurement sharing such as a speed associated with the UE and at least one of a radar sensing precision or a radar sensing accuracy of a radar system associated with the UE. The rate at which the UE, at 1110, determines updated network state information may be indicated in the first set of configuration parameters or may be based on other applications or operations at the UE. For example, an RSRP or a CBR may be measured for sidelink communication with a first frequency and/or the first set of configuration parameters may indicate a second frequency for determining state information. In some aspects, the first set of configuration parameters may include a plurality of different frequencies for updating a plurality of different network state information and/or other information related to the radar measurement sharing based on the speed at which changes to the network state information or other information related to the radar measurement sharing are likely to occur. For example, referring to FIG. 7, the UE 704 may determine, at 720, updated network state information. At 1112, the UE may perform a radar measurement based on the first set of configuration parameters and the updated network state information. For example, 1112 may be performed by radar measurement component 1242. The radar measurement may be performed by one or more devices associated with the UE. In some aspects, the radar measurements may further incorporate additional sensor data in generating radar measurement information. For example, referring to FIGS. 4 and 6, the radar-capable vehicle 402 or the radar-capable vehicles 603, 605, 607, 609, and 611 perform a set of radar measurements identifying radar information 417 including surfaces (e.g., surface 615) or bounding boxes 437 or 617.

Finally, at 1114, the UE may transmit, at a second radar measurement report rate selected based on the first set of configuration parameters and the updated network state information, a second set of radar measurement transmissions. For example, 1114 may be performed by radar measurement sharing component 1240. The radar measurements received from a particular UE may include bounding box information for objects detected by a radar system (or other object-detection systems) associated with the particular UE. Bounding box information is one example of radar data that may be transmitted to efficiently identify the location and size of objects, e.g., without sending each point identified by the radar measurements performed at the particular UE.

Figure 12:
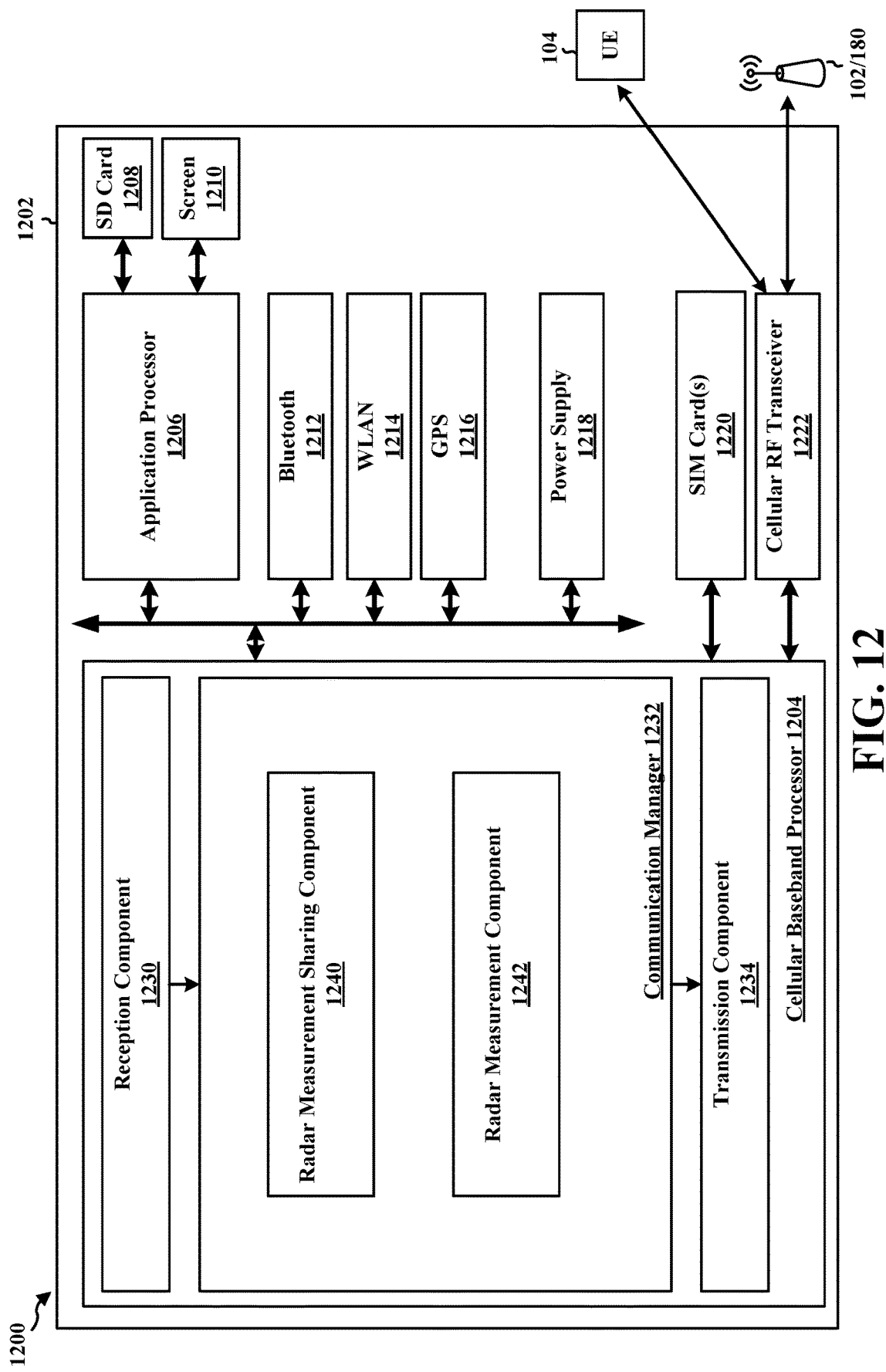
FIG. 12 is a diagram illustrating an example of a hardware implementation for an apparatus, in accordance with aspects presented herein.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the device 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire device (e.g., see 350 of FIG. 3) and include the additional modules of the apparatus 1202.

The communication manager 1232 includes a radar measurement sharing component 1240 that is configured to receive an indication to report a radar measurement to a wireless device, to receive a first set of configuration parameters for the radar measurement reporting, to determine network state information including at least a measure of congestion, and transmit a first set of radar measurement reports at a first radar measurement report rate selected based on the first set of configuration parameters and the network state information, e.g., as described in connection with 1002, 1004, 1008, 1102, 1104, 1108, 1110, and 1114 of FIGS. 10 and 11. The communication manager 1232 further includes a radar measurement component 1242 that receives input in the form of a local configuration for radar measurement sharing from the radar measurement sharing component 1240 and is configured to perform a radar measurement based on the first set of configuration parameters and network state information, e.g., as described in connection with 1006, 1106, and 1112.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from a wireless device, an indication to report a radar measurement to the wireless device. The apparatus 1202, and in particular the cellular baseband processor 1204, may further includes means for receiving a first set of configuration parameters for the radar measurement reporting. The apparatus 1202, and in particular the cellular baseband processor 1204, may further includes means for performing a radar measurement based on the first set of configuration parameters and network state information. The apparatus 1202, and in particular the cellular baseband processor 1204, may further includes means for transmitting, at a first radar measurement report rate selected based on the first set of configuration parameters and the network state information, a first set of radar measurement transmissions. The apparatus 1202, and in particular the cellular baseband processor 1204, may further includes means for transmitting, to at least one UE in the first set of one or more UEs, a second, updated set of configuration parameters for a second radar measurement report from the at least one UE. The apparatus 1202, and in particular the cellular baseband processor 1204, may further includes means for receiving, from the at least one UE, the second radar measurement report from the at least one UE based on the second, updated set of configuration parameters. The apparatus 1202, and in particular the cellular baseband processor 1204, may further includes means for transmitting, to each UE in a second set of one or more UEs that is disjoint from the first set of one or more UEs, an additional indication to refrain from reporting the radar measurement. The apparatus 1202, and in particular the cellular baseband processor 1204, may further includes means for updating the network state information, the updated network state information comprising at least a change in the measure of the congestion. The apparatus 1202, and in particular the cellular baseband processor 1204, may further includes means for performing a radar measurement based on the first set of configuration parameters and the updated network state information. The apparatus 1202, and in particular the cellular baseband processor 1204, may further includes means for transmitting, at a second radar measurement report rate selected based on the first set of configuration parameters and the updated network state information, a second set of radar measurement transmissions. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
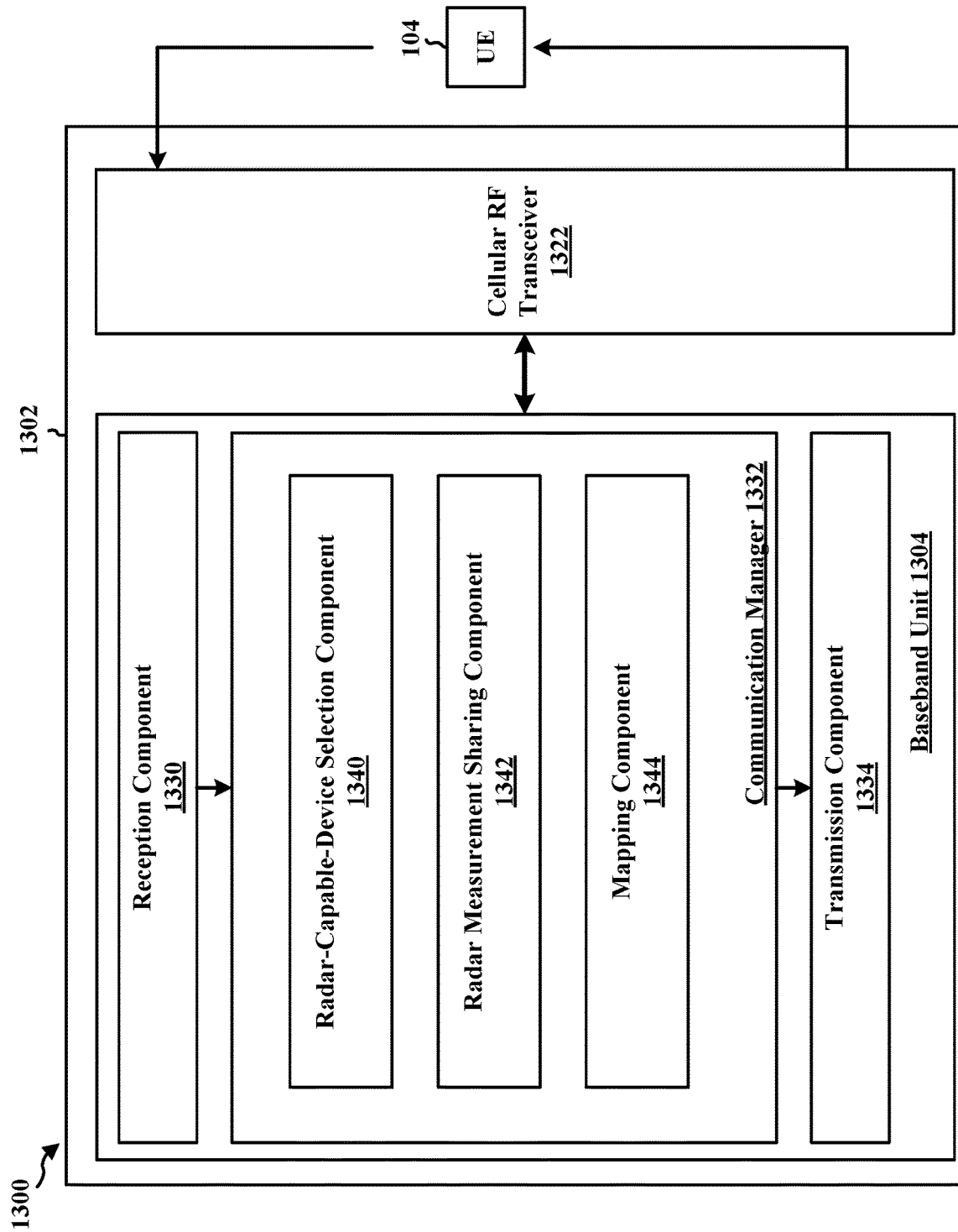
FIG. 13 is a diagram illustrating an example of a hardware implementation for an apparatus, in accordance with aspects presented herein.

FIG. 13 is a diagram 1300 illustrating an example of a hardware implementation for an apparatus 1302. The apparatus 1302 may be a base station, a component of a base station, or may implement base station functionality. In some aspects, the apparatus 1202 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the device 310 and may include the memory 376 and/or at least one of the TX processor 316, the RX processor 370, and the controller/processor 375.

The communication manager 1332 includes a radar-capable-device selection component 1340 that may receive location information for each of a plurality of UEs; select a first set of one or more UEs from a plurality of UEs for a radar measurement reporting based on location information; transmit, to each UE in the first set of one or more UEs, an indication to report at least one radar measurement; transmit, to each UE in a second set of one or more UEs that are not in the first set of one or more UEs, an additional indication to not report the radar measurement, and transmit, to each UE in the first set of one or more UEs, a first set of configuration parameters for the radar measurement reporting, e.g., as described in connection with 802, 902, 904, 906, 908, 910, and 916 of FIGS. 8 and 9. The communication manager 1332 further includes a radar measurement sharing component 1342 that may receive, from each UE in the first set of one or more UEs, a radar measurement report based on a radar measurement performed at a corresponding UE; e.g., as described in connection with 804, 912, and 918 of FIGS. 8 and 9. The communication manager 1332 further includes a mapping component 1344 that may generate an environment map based on received radar measurement reports from the first set of one or more UEs, e.g., as described in connection with 914 of FIG. 9.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for selecting a first set of one or more UEs from a plurality of UEs for the radar measurement reporting. The apparatus 1302, and in particular the baseband unit 1304, may further include means for transmitting, to each UE in the first set of one or more UEs, an indication to report at least one radar measurement. The apparatus 1302, and in particular the baseband unit 1304, may further include means for receiving, from each UE in the first set of one or more UEs, a radar measurement report based on a radar measurement performed at the UE in the first set of one of more UEs. The apparatus 1302, and in particular the baseband unit 1304, may further include means for generating an environment map based on received radar measurement reports from the first set of one or more UEs. The apparatus 1302, and in particular the baseband unit 1304, may further include means for receiving location information for each of the plurality of UEs, the selecting being based on the location information. The apparatus 1302, and in particular the baseband unit 1304, may further include means for transmitting, to each UE in the first set of one or more UEs, a first set of configuration parameters for the radar measurement reporting. The apparatus 1302, and in particular the baseband unit 1304, may further include means for receiving a first radar measurement transmission, from a first UE, based on a first configuration for the radar measurement. The apparatus 1302, and in particular the baseband unit 1304, may further include means for receiving a second radar measurement transmission, from a second UE, based on a different, second configuration for the radar measurement. The apparatus 1302, and in particular the baseband unit 1304, may further include means for transmitting, to at least one UE in the first set of one or more UEs, a second, updated set of configuration parameters for a second radar measurement report from the at least one UE. The apparatus 1302, and in particular the baseband unit 1304, may further include means for receiving, from the at least one UE, the second radar measurement report from the at least one UE based on the second, updated set of configuration parameters. The apparatus 1302, and in particular the baseband unit 1304, may further include means for transmitting, to each UE in a second set of one or more UEs that are not in the first set of one or more UEs, an additional indication to not report the radar measurement. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method for wireless communication including transmitting, to each UE in a first set of one or more UEs, an indication to report at least one radar measurement; and receiving, from each UE in the first set of one or more UEs, a radar measurement report based on a radar measurement performed at a corresponding UE in the first set of one of more UEs.

Aspect 2 is the method of aspect 1, further including generating an environment map based on received radar measurement reports from the first set of one or more UEs.

Aspect 3 is the method of any of aspects 1 and 2, further including receiving location information for each of a plurality of UEs, the selecting being based on the location information and selecting, based on the received location information, the first set of one or more UEs from the plurality of UEs for the radar measurement reporting.

Aspect 4 is the method of any of aspects 1 to 3, where selecting the first set of UEs includes selecting a set of UEs that are separated by at least a threshold distance from one or more of a network node or from another UE in the first set of one or more UEs.

Aspect 5 is the method of any of aspects 1 to 4, where the location information is received through at least one of reflection of a radar signal, a sidelink message, or a collaborative mapping based on shared information from at least one additional device.

Aspect 6 is the method of any of aspects 1 to 5, further including transmitting, to each UE in the first set of one or more UEs, a first set of configuration parameters for the radar measurement reporting, where the first set of configuration parameters includes at least one of a minimum radar measurement report rate, a maximum radar measurement report rate, a priority associated with the radar measurement report, a frequency range associated with a transmission of the radar measurement transmission, a data rate, or a modulation and coding scheme associated with a transmission of the radar measurement report.

Aspect 7 is the method of aspect 6, where receiving, from each UE in the first set of one or more UEs, the radar measurement transmission includes receiving, from a first UE in the first set of one or more UEs, a first radar measurement report based on a first configuration for the radar measurement and receiving, from a second UE in the first set of one or more UEs, a second radar measurement report based on a different, second configuration for the radar measurement.

Aspect 8 is the method of any of aspects 6 and 7, where the first set of configuration parameters is based on a set of network state parameters including at least one of a mean computation time per radar measurement report, or an amount of computation power for processing the radar measurement report.

Aspect 9 is the method of any of aspects 6 to 8, further including transmitting, to at least one UE in the first set of one or more UEs, a second, updated set of configuration parameters for a second radar measurement report from the at least one UE; and receiving, from the at least one UE, the second radar measurement report from the at least one UE based on the second, updated set of configuration parameters.

Aspect 10 is the method of any of aspects 1 to 9, further including transmitting, to each UE in a second set of one or more UEs that is disjoint from the first set of one or more UEs, an additional indication to refrain from reporting the radar measurement.

Aspect 11 is the method of any of aspects 1 to 10, where the apparatus is one of a base station, a network node, a RSU, or a UE.

Aspect 12 is an method for a radar measurement reporting at a UE including receiving, from a wireless device, an indication to report a radar measurement to the wireless device; receiving a first set of configuration parameters for the radar measurement reporting; performing a radar measurement based on the first set of configuration parameters and network state information; and transmitting, at a first radar measurement report rate selected based on the first set of configuration parameters and the network state information, a first set of radar measurement reports.

Aspect 13 is the method of aspect 12, where the first set of configuration parameters includes at least one of a minimum radar measurement report rate, a maximum radar measurement report rate, a priority associated with the first set of radar measurement reports, a frequency range associated with a transmission of the first set of radar measurement reports, a data rate, or a modulation and coding scheme associated with a transmission of the first set of radar measurement reports.

Aspect 14 is the method of any of aspects 12 and 13, where the network state information includes a measure of a congestion, where the measure of the congestion includes at least one of a measured RSRP, a CBR, a first number of UEs communicating with the wireless device, a second number of UEs participating in the radar measurement reporting, or a packet delay associated with communication between the UE and the wireless device; and where the first radar measurement report rate is selected based on the measure of the congestion.

Aspect 15 is the method of aspect 14, where the first set of configuration parameters for the radar measurement report further includes a set of parameters for determining a radar measurement report rate based on the network state information.

Aspect 16 is the method of any of aspects 14 and 15, where the first radar measurement report rate is further based on a speed associated with the UE and at least one of a radar sensing precision or a radar sensing accuracy of a radar system associated with the UE.

Aspect 17 is the method of any of aspects 14 to 16, further including updating the network state information, the updated network state information including at least a change in the measure of the congestion; performing a second radar measurement based on the first set of configuration parameters and the updated network state information; and transmitting, at a second radar measurement report rate selected based on the first set of configuration parameters and the updated network state information, a second set of radar measurement reports.

Aspect 18 is a is an apparatus for wireless communication including at least one processor coupled to a memory, the memory and the at least one processor configured to implement any of aspects 1 to 17.

Aspect 19 is an apparatus for wireless communication including means for implementing any of aspects 1 to 17.

Aspect 20 is a computer-readable medium storing computer executable code, where the code when executed by a processor causes the processor to implement any of aspects 1 to 17.

What is claimed is:

1. An apparatus for wireless communication comprising:
memory; and
one or more processors coupled to the memory and configured to:
select, from a plurality of user equipments (UEs) associated with a region of interest, a first set of one or more UEs that includes a subset of the plurality of UEs;
transmit, to each UE in the first set of one or more UEs, an indication to report at least one radar measurement; and
receive, from each UE in the first set of one or more UEs, a radar measurement report in response to the indication that comprises information about a location and a size of one or more detected objects.

2. The apparatus of claim 1, wherein the one or more processors are further configured to:
generate an environment map based on the radar measurement report received from each UE in the first set of one or more UEs.

3. The apparatus of claim 1, wherein the one or more processors are further configured to:
receive location information for each of the plurality of UEs, wherein to select the first set of one or more UEs, the one or more processors are further configured to:
select, based on the received location information, the first set of one or more UEs from the plurality of UEs for the radar measurement report.

4. The apparatus of claim 3, wherein to select, based on the received location information, the first set of one or more UEs from the plurality of UEs, the one or more processors are further configured to;
select, to include in the first set of one or more UEs, at least one UE that is separated by at least a threshold distance from one or more of a network node or from another UE in the first set of one or more UEs.

5. The apparatus of claim 3, wherein the location information is received through at least one of:
reflection of a radar signal,
a sidelink message, or
a collaborative mapping based on shared information from at least one additional device.

6. The apparatus of claim 1, wherein the one or more processors are further configured to:
transmit, to each UE in the first set of one or more UEs, a first set of configuration parameters for radar measurement reporting, wherein the first set of configuration parameters comprises at least one of:
a minimum radar measurement reporting rate,
a maximum radar measurement reporting rate,
a priority associated with the radar measurement reporting,
a frequency range associated with a transmission of the radar measurement reporting,
a data rate, or
a modulation and coding scheme (MCS) associated with the transmission of the radar measurement reporting.

7. The apparatus of claim 6, wherein to receive the radar measurement report from each UE in the first set of one or more UEs, the one or more processors are further configured to:
receive, from a first UE in the first set of one or more UEs, a first radar measurement report based on a first configuration for the at least one radar measurement, and
receive, from a second UE in the first set of one or more UEs, a second radar measurement report based on a different, second configuration for the at least one radar measurement.

8. The apparatus of claim 6, wherein the first set of configuration parameters is based on a set of network state parameters that comprises at least one of:
a mean computation time per radar measurement report received from each UE in the first set of one or more UEs, or
an amount of computation power to process received radar measurement reports.

9. The apparatus of claim 6, wherein the one or more processors are further configured to:
transmit, to at least one UE in the first set of one or more UEs, an updated set of configuration parameters for a second radar measurement report from the at least one UE; and
receive, from the at least one UE, the second radar measurement report based on the updated set of configuration parameters.

10. The apparatus of claim 1, wherein the one or more processors are further configured to:

transmit, to each UE in a second set of one or more UEs that is disjoint from the first set of one or more UEs, an additional indication to refrain from reporting the at least one radar measurement.

11. The apparatus of claim 1, wherein the apparatus is one of a base station, a network node, a road side unit (RSU), or a second UE.

12. The apparatus of claim 1, further comprising a transceiver coupled to the one or more processors.

13. An apparatus for a radar measurement report at a user equipment (UE), comprising:
    memory; and
    one or more processors coupled to the memory and configured to cause the UE to:
        receive, from a wireless device, an indication to report a radar measurement to the wireless device;
        receive a first set of configuration parameters for the radar measurement report, wherein the first set of configuration parameters for the radar measurement report comprises a set of parameters for a determination of a radar measurement report rate by the UE based on network state information;
        determine the network state information, wherein the network state information comprises a measure of network congestion;
        perform a first radar measurement based on the first set of configuration parameters and the determined network state information; and
        transmit, at a first radar measurement report rate selected by the UE based on the first set of configuration parameters and the measure of the network congestion, a first set of radar measurement reports.

14. The apparatus of claim 13, wherein the first set of configuration parameters further comprises at least one of:
    a minimum radar measurement report rate,
    a maximum radar measurement report rate,
    a priority associated with the first set of radar measurement reports,
    a frequency range associated with a transmission of the first set of radar measurement reports,
    a data rate, or
    a modulation and coding scheme (MCS) associated with the transmission of the first set of radar measurement reports.

15. The apparatus of claim 13, wherein the measure of the network congestion comprises at least one of:
    a measured reference signal received power (RSRP),
    a channel busy ratio (CBR),
    a first number of UEs that communicate with the wireless device,
    a second number of UEs that participate in the radar measurement report, or
    a packet delay associated with communication between the UE and the wireless device.

16. The apparatus of claim 15, wherein the first radar measurement report rate is further based on a speed associated with the UE and at least one of a radar sensing precision or a radar sensing accuracy of a radar system associated with the UE.

17. The apparatus of claim 15, wherein the one or more processors are further configured to cause the UE to:
    update the network state information, wherein the updated network state information comprises at least a change in the measure of the network congestion;
    perform a second radar measurement based on the first set of configuration parameters and the updated network state information; and
    transmit, at a second radar measurement report rate selected based on the first set of configuration parameters and the updated network state information, a second set of radar measurement reports.

18. The apparatus of claim 13, further comprising a transceiver coupled to the one or more processors.

19. A method for radar measurement reporting at a wireless device comprising:
    selecting, from a plurality of user equipments (UEs) associated with a region of interest, a first set of one or more UEs including a subset of the plurality of UEs;
    transmitting, to each UE in the first set of one or more UEs, an indication to report at least one radar measurement; and
    receiving, from each UE in the first set of one or more UEs, a radar measurement report in response to the indication comprising information about a location and a size of one or more detected objects.

20. The method of claim 19, further comprising:
    generating an environment map based on the radar measurement report received from each UE in the first set of one or more UEs.

21. The method of claim 19, further comprising:
    receiving location information for each of the plurality of UEs, wherein selecting the first set of one or more UEs comprises selecting, based on the location information, a set of UEs that are separated by at least a threshold distance from one or more of a network node or from another UE in the first set of one or more UEs.

22. The method of claim 21, wherein the location information is received through at least one of:
    reflection of a radar signal,
    a sidelink message, or
    a collaborative mapping based on shared information from at least one additional device.

23. The method of claim 19, further comprising:
    transmitting, to each UE in the first set of one or more UEs, a first set of configuration parameters for the radar measurement reporting, wherein the first set of configuration parameters is based on a set of network state parameters comprising at least one of a mean computation time per radar measurement report received from each UE in the first set of one or more UEs, or an amount of computation power for processing received radar measurement reports, and the first set of configuration parameters comprises at least one of:
    a minimum radar measurement report rate,
    a maximum radar measurement report rate,
    a priority associated with the radar measurement reporting,
    a frequency range associated with a transmission of the radar measurement reporting,
    a data rate, or
    a modulation and coding scheme associated with the transmission of the radar measurement reporting.

24. The method of claim 19, further comprising:
    transmitting, to at least one UE in the first set of one or more UEs an updated set of configuration parameters for a second radar measurement report from the at least one UE; and
    receiving, from the at least one UE, the second radar measurement report based on the updated set of configuration parameters.

25. A method for a radar measurement report at a user equipment (UE) comprising:
    receiving, from a wireless device, an indication to report a radar measurement to the wireless device;

receiving a first set of configuration parameters for the radar measurement report, wherein the first set of configuration parameters for the radar measurement report further comprises a set of parameters for determining a radar measurement report rate by the UE based on network state information;

determining the network state information, wherein the network state information comprises a measure of network congestion;

performing a first radar measurement based on the first set of configuration parameters and the determined network state information; and transmitting, at a first radar measurement report rate selected by the UE based on the first set of configuration parameters and the measure of the network congestion, a first set of radar measurement reports.

26. The method of claim 25, wherein:

the first set of configuration parameters further comprises at least one of a minimum radar measurement report rate, a maximum radar measurement report rate, a priority associated with the first set of radar measurement reports, a frequency range associated with a transmission of the first set of radar measurement reports, a data rate, or a modulation and coding scheme associated with the transmission of the first set of radar measurement reports; and the measure of the network congestion comprises at least one of a measured reference signal received power (RSRP), a channel busy ratio (CBR), a first number of UEs communicating with the wireless device, a second number of UEs participating in a radar measurement reporting, or a packet delay associated with communication between the UE and the wireless device.

27. The method of claim 26, wherein the first radar measurement report rate is further based on a speed associated with the UE and at least one of a radar sensing precision or a radar sensing accuracy of a radar system associated with the UE.

28. The method of claim 26, further comprising:

updating the network state information, the updated network state information comprising at least a change in the measure of the network congestion;

performing a second radar measurement based on the first set of configuration parameters and the updated network state information; and transmitting, at a second radar measurement report rate selected based on the first set of configuration parameters and the updated network state information, a second set of radar measurement reports.

29. A non-transitory computer-readable medium storing computer executable code at a user equipment (UE), the code when executed by one or more processors causes the one or more processors to:

select, from a plurality of user equipments (UEs) associated with a region of interest, a first set of one or more UEs that includes a subset of the plurality of UEs;

transmit, to each UE in the first set of one or more UEs, an indication to report at least one radar measurement; and receive, from each UE in the first set of one or more UEs, a radar measurement report that comprises information about a location and a size of one or more objects detected based on a radar measurement performed at a corresponding UE in the first set of one or more UEs.

30. A non-transitory computer-readable medium storing computer executable code at a user equipment (UE), the code when executed by one or more processors causes the one or more processors to:

receive, from a wireless device, an indication to report a radar measurement to the wireless device;

receive a first set of configuration parameters for a radar measurement report, wherein the first set of configuration parameters for the radar measurement report comprises a set of parameters fora determination of a radar measurement report rate by the UE based on network state information;

determine the network state information, wherein the network state information comprises a measure of network congestion;

perform a first radar measurement based on the first set of configuration parameters and the determined network state information; and transmit, at a first radar measurement report rate selected by the UE based on the first set of configuration parameters and the measure of the network congestion, a first set of radar measurement reports.

* * * * *